(12) United States Patent
Walker et al.

(10) Patent No.: US 6,985,879 B2
(45) Date of Patent: Jan. 10, 2006

(54) SYSTEMS AND METHODS FOR FACILITATING GROUP REWARDS

(75) Inventors: Jay S. Walker, Ridgefield, CT (US); Magdalena M. Fincham, Norwalk, CT (US); Stephen C. Tulley, Fairfield, CT (US); Andrew S. Van Luchene, New York, NY (US); Daniel E. Tedesco, Huntington, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 10/244,262

(22) Filed: Sep. 16, 2002

(65) Prior Publication Data

US 2003/0200143 A9 Oct. 23, 2003

Related U.S. Application Data

(63) Continuation-in-part of application No. 09/118,414, filed on Jul. 17, 1998, now abandoned, which is a continuation-in-part of application No. 08/948,144, filed on Oct. 9, 1997, now Pat. No. 6,128,599.

(51) Int. Cl.
*G06F 17/60* (2006.01)

(52) U.S. Cl. .............................. 705/35; 705/37; 705/39; 705/26; 705/27; 705/14

(58) Field of Classification Search .................. 705/14, 705/25, 26
See application file for complete search history.

(56) References Cited

U.S. PATENT DOCUMENTS

| | | | |
|---|---|---|---|
| 4,876,592 A | 10/1989 | Von Kohorn | 358/84 |
| 5,025,372 A | 6/1991 | Burton et al. | 364/406 |
| 5,053,957 A | 10/1991 | Suzuki | 364/405 |
| 5,056,019 A * | 10/1991 | Schultz et al. | |
| 5,287,268 A | 2/1994 | McCarthy | 364/405 |
| 5,297,026 A | 3/1994 | Hoffman | 364/408 |
| 5,466,919 A | 11/1995 | Hovakimian | 235/380 |
| 5,483,444 A | 1/1996 | Heintzeman et al. | 364/401 |
| 5,537,314 A | 7/1996 | Kanter | 364/406 |
| 5,621,640 A | 4/1997 | Burke | 395/214 |
| 5,649,116 A | 7/1997 | McCoy et al. | 395/238 |

(Continued)

OTHER PUBLICATIONS

Buying Groups: What have you done for me Lately? By Martha Glaser, Drug Topics, v136n11, pp 48-51, Jun. 8, 1992.*

Pat Allen, "Executive Bonuses Can be linked to Performance Ratios", Savings Institutions v 105n6 PP 135-137 Jun. 1984.*

(Continued)

*Primary Examiner*—James Myhre
*Assistant Examiner*—Khanh H. Le
(74) *Attorney, Agent, or Firm*—Carson C. K. Fincham; Magdalena Fincham

(57) ABSTRACT

In accordance with at least one embodiment of the present invention a retailer may receive a request from a group of customers for a reward the group desires to earn by making purchases at the retailer. In response to such a request the retailer determines purchasing conditions the group must satisfy in order to earn the reward. The purchasing conditions may be determined based on, for example, a value of the reward (e.g., a cost of the reward to the retailer), a number of customers in the group, and/or a time by which the group desires to earn the reward. The purchasing conditions may be determined such that the retailer realizes at least a predetermined profit after the cost of providing the reward is considered. The methods of the present invention may be implemented at an online and/or brick-and-mortar retailer.

29 Claims, 20 Drawing Sheets

U.S. PATENT DOCUMENTS

| | | | | |
|---|---|---|---|---|
| 5,710,886 | A | | 1/1998 | Christensen et al. ........ 395/214 |
| 5,806,045 | A | * | 9/1998 | Biorge et al. .................. 705/14 |
| 6,101,484 | A | * | 8/2000 | Halbert et al. |
| 6,128,599 | A | | 10/2000 | Walker et al. ................ 705/14 |
| 6,260,024 | B1 | * | 7/2001 | Shkedy ......................... 705/37 |
| 6,269,343 | B1 | * | 7/2001 | Pallakoff ...................... 705/26 |

OTHER PUBLICATIONS http://www.sms-direct.com/tipsand.htm Sales and marketing Strategies, Free- Tips and Tricks, copyright 2000, downloaded Feb. 9, 2003.*

"Drexel Alumni Affinity Card—Alumni Benefits", (http //alum ia Drexel edu), undated.

Leibson, Beth, "Buying Contracts Deliver the Goods, and Hefty Discounts Too", Design & Management, Apr. 1991, vol. 10, No. 4, pp. 54-57, ISSN: 0279-4438.

Glaser, Martha, "Buying Groups: What Have You Done for Me Lately", Drug Topics, Jun. 8, 1992, vol. 136, No. 11, pp. 48-51, ISSN: 0012-6616.

Sinton, Peter, "Pick a Card, But Not Just Any Card—Focus on rate, not rewards", The San Francisco Chronicle, Oct. 10, 1994, Section: Business, p. D1, It's Your Money.

Jones, Cliff, "Plastic Interest In Sweet Charity", The Guardian, Dec. 10, 1994, Section: The Guardian Money Page, p. 35.

McNulty, Mary Ann, "First Bank Is First Out With Relocation Card; Launches corporate cards for employee relocation expenses", Business Travel News, Apr. 17, 1995, Section: p. 16, ISSN: 8750-3670.

"Music Club 'Freebies' Can Still Cost You Plenty", May 13, 1995, Dialog File 9, Record No. 01192127.

Greene, Jay, "They're Selling Your Secrets", The Orange County Register, Apr. 21, 1996, Section: News, p. A01.

Jolis, Alan, "The Good Banker", The Independent, May 5, 1996, Section: Sunday Supplement, (http //titsoc soc titech ac jp/titsoc/higuchi-lab/icm/grameen-goodbaner html).

Website: "Binghamton University Alumni Association MasterCard Credit Card", (http //www webapply com/bingu/apply html), download date: Jul. 21, 1996.

Website: "Bradesco Credit Cards: Affinity Cards: Closed Groups", (http //www bradesco com br/veringl/ccard/affinity/closedc html), download date: Jul. 21, 1996.

Website: "MasterCard Affinity Card", (http www mcgill ca/alumni/m_card htm), download date: Jul. 21, 1996.

Website: "AAA Michigan Savings", (http //www aaamich com/savings/group/index html), download date: Mar. 25, 1997.

O'Malley, Chris, "RCA seeks to collar the affinity credit-card market", The Indianapolis Star, Mar. 28, 1997, Section: Business, p. F01.

Sanders, Edmund, "Card Sharks; Finance: Credit-card sharpies rake in big rebates by moving their debt around and charging to the maximum", The Orange County Register, Jun. 15, 1997, Section: Business, p. K01.

"Choosing a credit card", The Times, Jul. 5, 1997, Section: Features.

McNulty, Mary Ann, "GE Capital Idea: Push Policy", Business Travel News, Jul. 14, 1997, Issue 379.

Website: "BCAA Auto Related Products", (http //www bcaa bc ca/auto/body_auto_prod html), download date: Mar. 12, 1998.

Website: "CASHMAX", (http //www centura com/cashcards/cashmax html), download date: Mar. 12, 1998.

Website: "Citibank Cards and Services", (http //www citibank com/us/cards/crd_svc/citicard/), download date: Mar. 12,1998.

Website: "Citibank Driver's Edge—Earning & Redeeming", (http //www Citibank com/us/cards/drivers-edge/earning htm), download date: Mar. 12, 1998.

Website: "Chase Gold Visa", (http //www chase com/goldvisa/rewardshtml), download date: Mar. 12, 1998.

Website: "Credit Cards—State Capitol Credit Union", (http www capitolcu org/credcard html), download date: Mar. 12, 1998.

Website: "Discover Card Features", (http //www discovercard com/discover/data/features htm), download date: Mar. 12, 1998.

Website: "GE Capital Consumer Financial Services", (http //www ge com/capital/consumer/rewards htm), download date: Mar. 12, 1998.

Website: "Kmart: Kmart Credit Card Rewards", (http //www kmart com/a%5Fprod/al%5Fce/ala%5Frew/ala%5Fct stm), download date: Mar. 12, 1998.

Website: "New Partners, more exciting rewards: The Membership Rewards program for 1998.", (http //www americanexpress com/rewards/news/docs/1998new_mr shtml), download date: Mar. 12, 1998.

Website: "Product Feature Chart—Mobil Business, Mobil Fleet, Mobil Speedpass", (http //www mobil com/business/credit/fleet/product html), download date: Mar. 12, 1998.

Seigle, Max, "School to use $5000 award for upgraded computer lab", Chicago Daily Herald, Dec. 27, 2000, Section: Neighbor, p. 1.

"Subscription Agreement For ICB Toll Free News Online Edition ("ICB")", (http //icbtollfree com/termslib htm), download date: Feb. 7, 2001.

Website: "Toll Free.Com—Login", (wysiwyg //12/http //icbtollfree com/Login cfm?NextURL=order cfm), download date: Feb. 8, 2001.

Website: "Toll Free.Com—Save Your Login Information", (wysiwyg //21/http //icbtollfree com/InfoSavePass cfm), download date: Feb. 8, 2001.

"Tiny little phones for sexy little worms", The Canberra Times, Feb. 18, 2002, Section: A, p. 16.

"Students Across the Nation Can Earn Up to $60,000 for Their Schools; Box Tops for Education Program Doubles in Size", Business Wire, Aug. 14, 2002.

Allen, Pat, "Executive Bonuses Can Be Linked to Performance Ratios", Savings Institutions, Jun. 1984, pp. 135-137.

Glaser, Martha, "Buying Groups: What Have you Done for Me Lately", Drug Topics, Jun. 8, 1992, vol. 136, No. 11, pp. 48-51, ISSN: 0012-6616.

"Team Decision-Making: Theory, Methodology, and Results", Management Matters, Jul. 1993, vol. 93, No. 07, ISSN: 1054-4275.

"Cellular Wrong Signals", Newsday Jul. 22, 1993, ISSN: 0278-5587.

Frank, John N, "Seeking their just rewards", Credit Card Management, Aug. 1996, vol. 9, No. 5, pp. 60-64, ISSN: 0896-9329.

"Do you measure up?", Management Accounting, Nov. 1996, pp. 32-34.

"Affinity Cards: A me-first attitude", Credit Card Management, Dec. 1996, vol. 9, No. 9, pp. 10-12, ISSN: 0896-9329.

Website: "Performance Appraisal Bibliography—Zigon Performance Group", (http //www zigonperf com/bibliogr htm), download date: Feb. 28, 2001.

* cited by examiner

400

| FREQUENT SHOPPER IDENTIFIER 401 | CONTACT INFORMATION 402 | GROUP IDENTIFIER 404 |
|---|---|---|
| 87126746 | TOM O'MALLEY<br>23 MAIN ST.<br>STAMFORD, CT           (203) 555-1212 | T1 |
| 1111-1111-1111-1111 | BOB McDONALD<br>918 VINE ST.<br>STAMFORD, CT           (203) 372-1092 | T1 |
| 89283481 | SUE SMITH<br>76 VICTORY LANE<br>NORWALK, CT           (203) 892-8276 | T2 |
| 80974361 | MARY O'BRIEN<br>12 PLEASANT DR. APT. #2<br>GREENWICH, CT           (203) 982-7152 | T2 |
| 80927814 | SAM SPENDER<br>FINANCIAL ACCT. NO. 0000 1111 2222 3333<br>SPENDER@WORK.COM | T3 |
| 80126734 | BILL PARKER<br>901 STREET<br>TOWN, USA           (203) 381-1927 | T3 |
| 1111-2222-3333-4444 | JAY JONES<br>TOWN, USA<br>           (203) 761-1192 | N/A |

FIG. 4

| REWARD IDENTIFIER 501 | REWARD TYPE 502 | REWARD RULES 504 | REWARD REDEMPTION METHOD 506 | STATUS NOTIFICATION METHOD 508 | REWARD NOTIFICATION METHOD 510 |
| --- | --- | --- | --- | --- | --- |
| R1 | $5.00 REBATE COUPON FOR EACH GROUP MEMBER | AGGREGATE GROUP SPENDING OF $1,000 / MONTH | REWARD ISSUED VIA POS TERMINAL PRINTER | OUTBOUND IVRU CALL TO GROUP MEMBERS | NOTIFY EACH GROUP MEMBER THROUGH ISSUING REWARD |
| R2 | $100.00 DONATION TO CHARITY OF GROUP'S CHOICE | 10 PURCHASES / FREQUENT SHOPPER / MONTH | STORE MANAGER TO ISSUE COMPANY CHECK TO GROUP LEADER | POS TERMINAL PRINTER MESSAGE TO GROUP MEMBERS | OUTPUT REWARD NOTIFICATION VIA POS TERMINAL PRINTER & POS SERVER PRINTER |
| R3 | 15% OFF NEXT PURCHASE OF UPC #102986721 | GROUP PURCHASE OF 10 OR MORE UPC #102986721 BEFORE 9/10/99 | APPLY 15% DISCOUNT TO EACH CUSTOMER'S NEXT PURCHASE OF UPC #102987621 AT POS TERMINAL | E-MAIL CUSTOMERS | E-MAIL CUSTOMERS |
| R4 | 10% NEXT PURCHASE TOTAL | > 3 WEEKDAY PURCHASES / MONTH / CUSTOMER | APPLY 10% DISCOUNT TO EACH CUSTOMER'S NEXT PURCHASE TOTAL | E-MAIL GROUP LEADER | OUTBOUND IVRU CALL TO CUSTOMERS |
| R5 | $50.00 DONATION TO CHARITY OF GROUP'S CHOICE | GROUP AVERAGE ≥ 4 PURCHASES / WEEK | STORE MANAGER TO ISSUE COMPANY CHECK TO GROUP LEADER | POS TERMINAL PRINTER MESSAGE TO GROUP MEMBERS | OUTPUT REWARD NOTIFICATION VIA POS TERMINAL PRINTER & POS SERVER PRINTER |

| GROUP IDENTIFIER 601 | REWARD IDENTIFIER 602 | REWARD STATUS 603 | FREQUENT SHOPPER IDENTIFIER 604 | STATUS 605 | GROUP LEADER(S) IDENTIFIERS 606 |
|---|---|---|---|---|---|
| T1 | R2 | 20/20 PURCHASES COMPLETE | 87126746 | ELIGIBLE/NOT_NOTIFIED/NOT_REDEEMED | 87126746 |
| T1 | R2 | 12/20 PURCHASES COMPLETE | 1111-1111-1111-1111 | ELIGIBLE/NOT_NOTIFIED/NOT_REDEEMED | 87126746 |
| T2 | R1 | $958 OF PURCHASES COMPLETE | 89283481 | NOT_ELIGIBLE/NOT_NOTIFIED/NOT_REDEEMED | 89283481 |
| T2 | R1 | $958 OF PURCHASES COMPLETE | 80974361 | NOT_ELIGIBLE/NOT_NOTIFIED/NOT_REDEEMED | 89283481 |
| T3 | R4 | >3 WEEKDAY PURCHASES / MEMBER THIS MONTH | 80927814 | ELIGIBLE/NOTIFIED/NOT_REDEEMED | 80927814 |
| T3 | R4 | >3 WEEKDAY PURCHASES / MEMBER THIS MONTH | 80126734 | ELIGIBLE/NOTIFIED/REDEEMED | 80927814 |

SYSTEMS AND METHODS FOR FACILITATING GROUP REWARDS

This application is a continuation-in-part application of U.S. patent application Ser. No. 09/118,414, filed Jul. 17, 1998 abandoned in the name of Walker et al. and entitled POINT-OF-SALE SYSTEM AND METHOD FOR THE MANAGEMENT OF GROUP REWARDS; which is a continuation-in-part application of U.S. patent application Ser. No. 08/948,144 entitled "Method and Apparatus for Processing Customized Group Reward Offers" filed on Oct. 9, 1997 in the name of Walker et al., and issued Oct. 3, 2000 as U.S. Pat. No. 6,128,599. The entirety of each of the above applications is incorporated by reference herein for all purposes.

BACKGROUND OF THE INVENTION

Retailers frequently attempt to motivate customers to make repeat purchases at the retailers' establishments. One form of such attempts involves enrollment of customers in a frequent shopper program with the retailer. Certain frequent shopper programs are well known and widely practiced by many retailers. These prior art programs typically provide a reward to customers when they meet certain purchasing criteria or goals. Through such programs, retailers may increase their customer base and market share by inducing customers to purchase a certain level of goods and/or services over a predetermined period of time. For example, a retailer may offer a reward to a customer (i.e., a "frequent shopper") who purchases $100.00 of goods and/or services in a month.

Such frequent shopper programs tend to result in larger retailer sales since a customer has the incentive to make all or many of his or her purchases through the one retailer offering a reward, rather than making purchases through competing retailers. The customer thus may become loyal to the retailer in an effort to meet the retailer's purchasing goals so that he or she may earn the reward.

However, in prior art frequent shopper programs, the retailers are at the mercy of the customer's personal motivation to meet the retailer's purchasing goals and obtain the reward. A customer may, at his or her whim, choose to forgo a reward by failing to meet the established purchasing goal. A customer's choice to forgo the reward thus results in a loss of potential sales to the retailer. Even if a customer were to incur a penalty for failing to meet a purchasing goal, a customer's personal willingness to incur the penalty or forego a potential reward results in a loss of potential sales to the retailer. Thus, a need exists to better motivate a customer to meet a purchasing goal of a retailer in order to earn a reward, thereby generating more completed sales for the retailer.

The present invention overcomes the drawbacks of the prior art and may be understood with reference to the drawings and description thereof provided herein.

BRIEF DESCRIPTION OF THE DRAWINGS

FIG. 4 is a schematic illustration of a frequent shopper database, in accordance with one or more embodiments of the present invention.

FIG. 5 is a schematic illustration of a reward rules database, in accordance with one or more embodiments of the present invention.

FIG. 6 is a schematic illustration of a group status database, in accordance with one or more embodiments of the present invention.

DETAILED DESCRIPTION OF SOME EMBODIMENTS OF THE PRESENT INVENTION

Figure 1A:
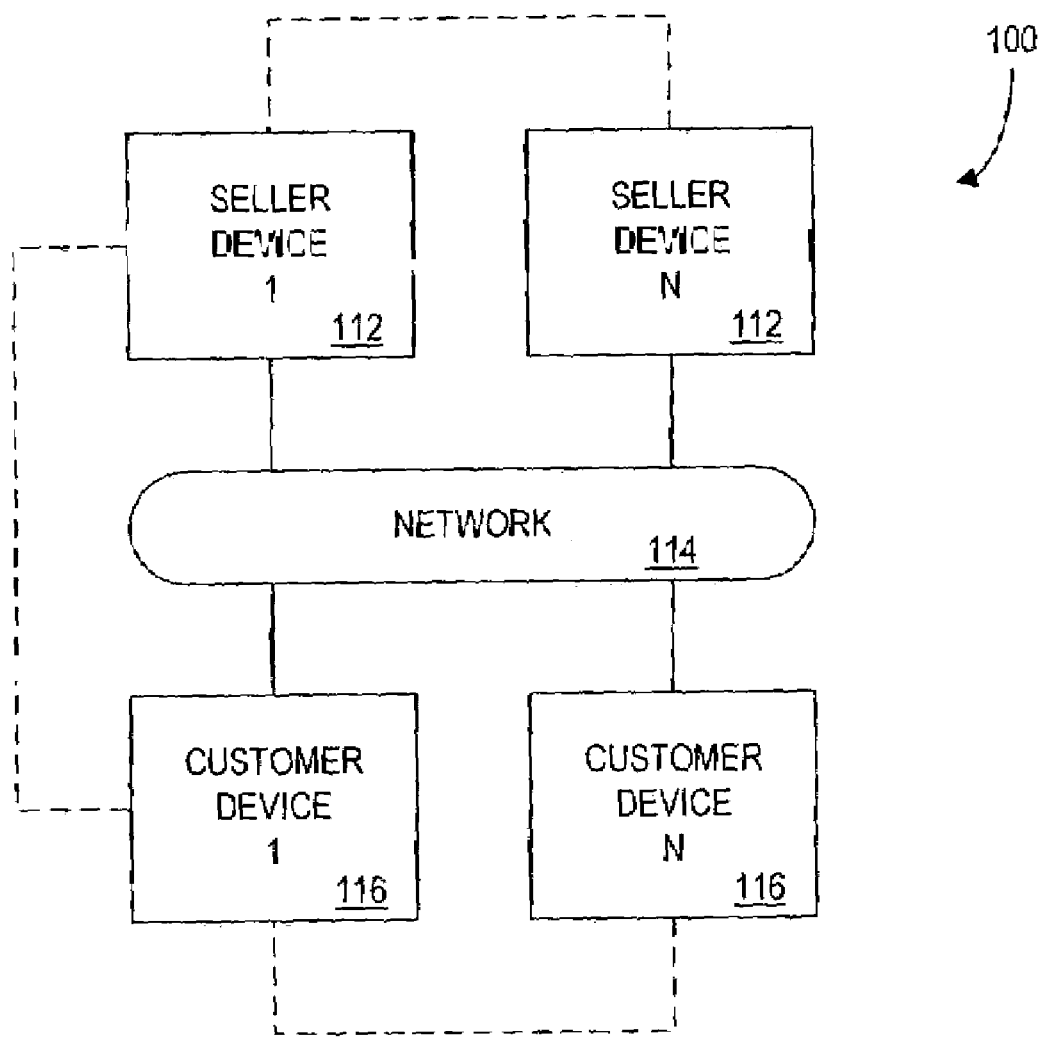
FIG. 1A is a block diagram illustrating a system in accordance with one or more embodiments of the present invention.

One or more embodiments of the present invention provide an advantage over prior art automated frequent shopper programs by allowing two or more customers to register as a group, or "shopping team," with a retailer or other entity who manages a group reward program. Generally, a group reward program of the present invention is a frequent shopper program that allows individual customers to register with a retailer or other entity as a group and allows the group to earn a reward from the retailer or other entity based on the group's satisfaction of one or more conditions. The one or more conditions may comprise, for example, purchasing conditions that define purchases (e.g., a number and/or value of purchases) the group has to complete at one or more retailers.

The group reward system of the present invention overcomes disadvantages of the prior art in that a customer that is earning a reward as part of a group is less likely to fail to meet the conditions for earning the reward because the remainder of the group would suffer as a result of the customer's failure. For example, in prior art frequent shopper systems a customer may simply forget to make a purchase in order to earn a reward. Or a customer may decide that he no longer wishes to earn the reward or does not mind foregoing a reward and thus discontinue making purchases. In the prior art systems such a decision only has an adverse direct effect on the customer himself and the retailer. In the system of the present invention, a customer's decision to forego a reward adversely affects the remaining members of the customer's group who will not be able to earn a reward or will have a more difficult time earning the reward due to the customer's default. An individual customer is likely to attempt to avoid dissapointing or upsetting the remaining members of his group and thus will continue to make purchases in order to earn the reward. Similarly, an individual customer that is earning a reward as part of a group in accordance with the present invention is less likely to forget to make purchases in order to earn the reward since the remaining group members are likely to remind the customer to make the purchases based on their own desire to earn the reward.

In order to become eligible to receive the reward, a group must satisfy certain conditions established by the group reward program. For example, a condition may be a number of purchases or a value (e.g., dollar amount) of purchases to be achieved. A condition may also include a time limitation within which the purchases are to be achieved. The time limitation may be a standard measurement of time, such as a day, a week, a month or a year. A condition may further include a specific time period for making qualified purchases, such as between the dates of Jun. 1, 1998 and Jul. 1, 1998.

In accordance with one or more embodiments of the present invention, upon registration in a group reward program, each customer in the group may, for example, receive a frequent shopper card that contains an identifier corresponding to the customer and/or an identifier corresponding to the group to which the customer belongs. The customer, when at a point-of-sale terminal or other point-of-purchase, may provide the card and/or identifier each time he or she undertakes a transaction with the retailer. The point-of-sale terminal may be coupled with other point-of-sale terminals through a network server. It should be noted that a retailer may comprise both an online retailer and a brick-and-mortar retailer. Accordingly, a point-of-sale terminal may comprise a point-of-sale terminal in a store or a computing device that receives transaction information from a remote computing device operated by a customer. The point-of-sale terminal may record the purchases made by the customer and send the purchase record to the network server for storage. The network server, in turn, may store the transaction data and determine a status of the group by comparing the transaction data stored for each customer in the group to a condition stored in the system for the subject group. Rewards can be issued either automatically or manually by the retailer when the purchasing performance of the group meets the one or more conditions established for earning the reward.

The purchasing performance of the group can be determined in several ways. For example, in one or more embodiments, rewards are issued based on an average performance of the group. In one or more other embodiments, rewards are issued based on an average performance of each customer in the group. In one or more other embodiments, rewards are issued based on the aggregate performance of the group or the aggregate performance of each customer in the group.

The one or more conditions that the group must satisfy in order to earn the reward may be expressed, for example, in terms of: (i) a number of purchases to be made by one or more customers, (ii) a dollar value of purchases to be made by one or more customers, (iii) a number of purchases to be made by one or more customers within a predetermined time or before a predetermined date, (iv) a dollar value of purchases to be made by one or more customers within a predetermined time or before a predetermined date, (v) a specific time or times during which purchases must be made by one or more customers, or (vi) any combination thereof.

When a group's purchasing performance meets the one or more predetermined conditions, the group becomes eligible for a reward, such as free or discounted products offered by the retailer, or other rewards. The reward may be determined by the retailer or may be suggested by the group when it registers. Some embodiments wherein one or more customers of a group suggest a reward to a retailer are described in more detail below.

A value of the reward may determine the one or more conditions set by the retailer. After a reward is earned, the group may be notified of its eligibility to receive the reward. The retailer may then issue the reward to the group in several ways. For instance, each customer in the group may be given the reward or the reward may be given to the registered group leader for distribution to the remaining customers. In another embodiment, the reward may be given to the group up-front at the time of its registration, before any predetermined condition(s) have been satisfied (e.g., before qualified purchases have been made).

It should be noted that in accordance with one or more embodiments of the present invention, once a group earns a reward the group may continue making purchases in accordance with the one or more conditions to earn another reward or another unit of the reward. For example, assume a group registers for a reward that is a cash amount (e.g., $5.00) to be given to each member of the group, wherein the group is to spend an aggregate of $1,000 at the retailer over a period of thirty days in order to earn the reward. In this example, once the group satisfies the conditions and spends $1,000 at the retailer over a period of thirty days, each member of the group may be provided with the cash amount reward and the group may automatically continue to earn another reward of the cash amount over a subsequent thirty day period. In other words, the group reward program described in one or more embodiments of the present invention is not necessarily a one-time reward but may be a reward that the group continues to earn and obtain as long as it meets the conditions associated with the reward.

Other features and advantages of this invention are readily apparent from the following detailed description when taken in conjunction with the accompanying drawings. Embodiments of the present invention will now be discussed with reference to FIGS. 1A–14.

FIG. 1A illustrates a system 100, in accordance with one or more embodiments of the present invention, wherein one or more seller devices 112 communicate with one or more customer devices 116 via a network 114. It should be understood that although only two seller devices 112 and two customer devices 116 are illustrated, any number of seller devices and customer devices may be used. Further, a first retailer may operate a first seller device 112 while a second retailer may operate a second seller device 112. It should also be understood, as illustrated in FIG. 1A, that one or more seller devices 112 may communicate directly with one or more customer devices 116 rather than via the network 114. Further, in accordance with one or more embodiments of the present invention, a seller device 112 may perform some of the functions of a customer device 116 as described herein and a customer device 116 may perform some or all of the functions of a seller device 112 as described herein. In some embodiments a seller device 112 and a customer device 116 may be embodied as a single device.

A seller device 112 may comprise any computing device operable to perform some of the methods of the present invention. For example, a seller device 112 may be operable to (i) register one or more customers for a group reward, (ii) process purchases completed by one or more customers, (iii) track purchases made by one or more customers, (iv) output messages (e.g., an invitation to join a group or an indication of a group's performance in earning a reward) to one or more customers, (v) output messages to one or more operators of the seller device (e.g., a prompt to inform a customer of an available group to join), (vi) issue a reward to one or more customers, (vii) apply a reward to a purchase being made by one or more customers, and/or (viii) communicate with one or more customer devices 112, one or more other seller devices 112, and/or network 114.

In one or more embodiments of the system 100, one or more of the seller devices 112 may comprise a point-of-sale terminal, such as the kind commonly manufactured by National Cash Register, Corp.™ or International Business Machines, Corp.™. In one or more embodiments of the system 100, one or more of the seller devices 112 may comprise a point-of-sale network server. A point-of-sale network server may be a computer network server of the type commonly manufactured by International Business Machines, Corp™. In one or more embodiments of the system 100, one or more of the seller devices 112 may be a server hosting a Web site for an online retailer. In one or more embodiments of the system 100, one or more of the seller devices 112 may be a computer or kiosk located at a retailer or other location. It should be understood that in a single embodiment of the system 100, one or more of the seller devices 112 may comprise a first type of computing device (e.g., a point-of-sale terminal) while another seller device 112 comprises a second type of computing device (e.g., a kiosk).

It will be apparent to one of ordinary skill in the art that it is not necessary for the one or more seller devices 112 to be of the exact same structure, though they should preferably be mutually compatible so that they may operate together in the system 100. Also, in embodiments wherein one or more of the seller devices 112 comprise a point-of-sale terminal, the point-of-sale terminal may be equipped to accommodate additional add-on devices regularly used by retailers in the retail industry.

A customer device 116 may comprise any computing device operable to perform at least some of the methods of the present invention. A customer device 116 may be any computing device operable to allow a customer to participate in a group reward program of the present invention. For example, a customer device 116 may be operable to (i) facilitate a purchase by one or more customers, (ii) transmit a customer's request to register for a reward to (or communicate other data to and/or from) a seller device 112 and/or network 114, (iii) output messages to one or more customers (e.g., an indication of progress towards earning a reward by a group, an indication of groups available to be joined, and/or an indication of other members' success in satisfying conditions), (iv) accept payment from a customer for a purchase, (v) issue a reward to one or more customers (e.g., print a discount coupon, receipt, redemption code, or gift certificate), and/or (vi) apply a reward to a purchase of one or more customers (e.g., reduce a purchase total by a discount earned by a group associated with a customer).

In accordance with one or more embodiments, a customer device 112 may comprise a personal computer (PC), a laptop computer, a personal digital assistant (PDA), a cellular telephone, a landline telephone, a pager, a kiosk, an electronic signature pad, or any combination thereof In one or more embodiments of the system 100, one customer device 112 may be embodied as a first type of computing device (e.g., a personal computer) while another customer device 112 may be embodied as a second type of computing device (e.g., a kiosk). A customer device 112 of system 100 may be located in the same location as a seller device 116 or in a different location. For example, a customer device 112 may be embodied as a personal computer located in the home of a customer while a seller device 116 may be embodied as a point-of-sale terminal or a server located at a retailer.

It should be noted that, in accordance with one or more embodiments of the present invention, one customer device 112 may be utilized by a customer to register for a group reward while another customer device 112 may be utilized by a customer to complete purchases in accordance with the group reward conditions. In such embodiments the two customer devices 112 may or may not be the same type of device. For example, a customer may utilize a kiosk to register for a group reward program and use a personal computer to complete purchases.

Network 114 can be a wire or wireless network. Network 114 may be any commonly known networking system such as a local area network (LAN), an Ethernet or token-ring network, a public telephone exchange system, a wide-area network (WAN), an extranet system, an intranet system, the Internet, another network protocol, or other means for communication as would be understood by those of ordinary skill in the art. It should be understood that communication between seller devices 112 and customer devices 116 may be direct or indirect. For example, communication may be via the Internet through a Web site maintained by a retailer associated with one or more of the seller devices 112 on a remote server or via an on-line data network including commercial on-line service providers, bulletin board systems and the like. In some embodiments, one or more of the customer devices 116 and one or more of the seller devices 112 may communicate over radio frequency ("RF"), infrared ("IR"), cable TV, satellite links and the like, including combinations thereof. It should be understood that devices in communication with one another may or may not communicate continuously.

The system 100, or portions thereof, may be located, for example, within a retailer's store, may facilitate communication among a plurality of retailers or a plurality of retailers' stores or may be an Internet-based sales system such as the kind operated by AMAZON.COM wherein the customer devices 116 are computing devices (e.g., personal computers, laptop computers, personal digital assistants, cellular telephones, landline telephones, pagers, and/or kiosks) operated by customers.

Figure 1B:
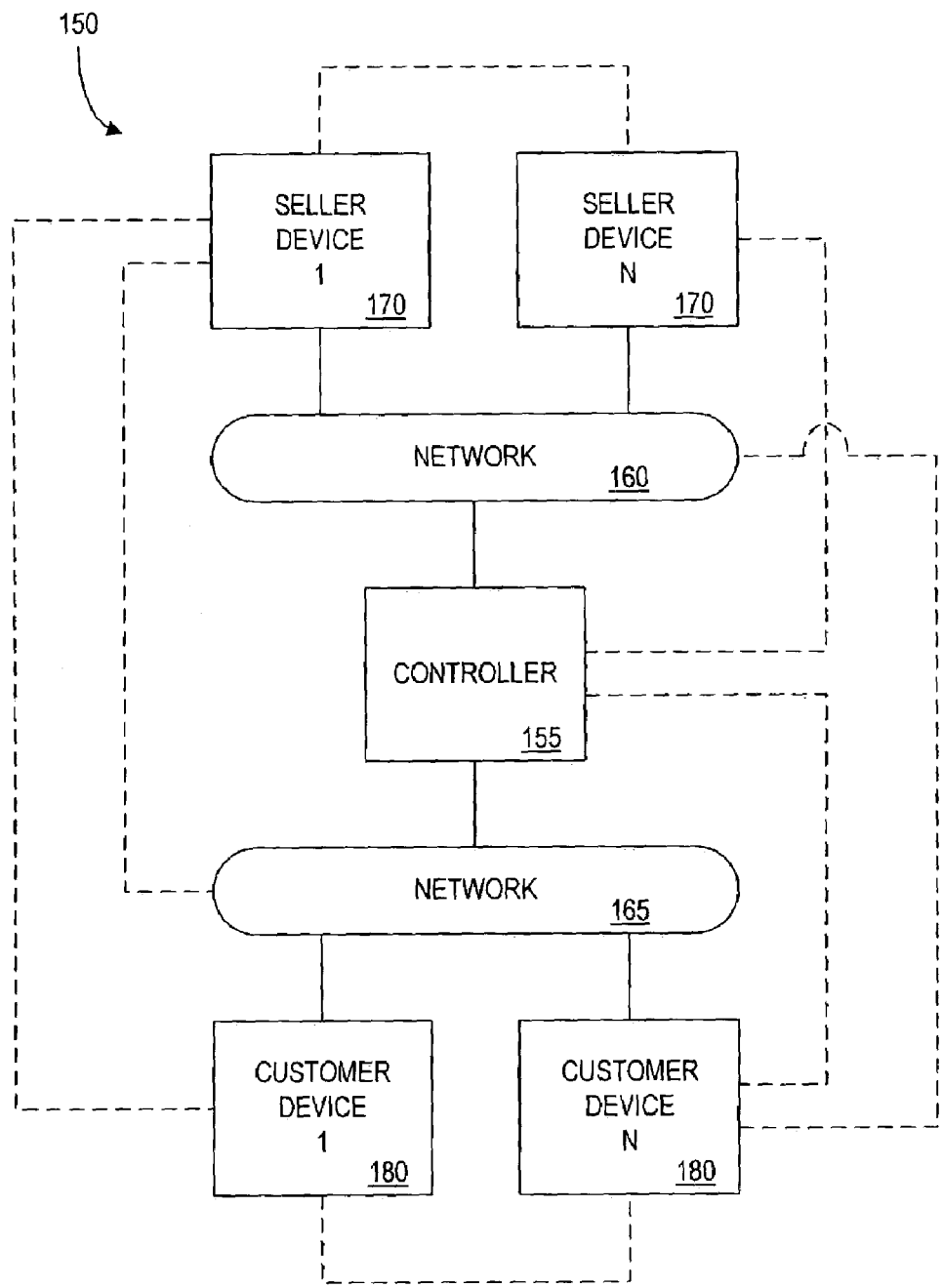
FIG. 1B is a block diagram illustrating another system in accordance with one or more embodiments of the present invention.

Referring now to FIG. 1B, a system 150 is illustrated, in accordance with one or more embodiments of the present invention. The system 150 comprises a controller 155 in communication with one or more seller devices 170 via a network 160 and one or more customer devices 180 via a network 165. In at least one embodiment the network 160 and the network 165 may be embodied as a single network. Although only two seller devices 170 and only two customer devices 180 are illustrated, any number of seller devices and customer devices may be used. A seller device 170 may be a computing device that is analogous to, and performs functions analogous of, a seller device 112 (FIG. 1A).

Similarly, a customer device 180 may be a computing device that is analogous to, and performs functions analogous of, the customer device 116 (FIG. 1A). Further, either or both of network 160 and network 165 may be analogous to the network 114 (FIG. 1A).

Figure 10:
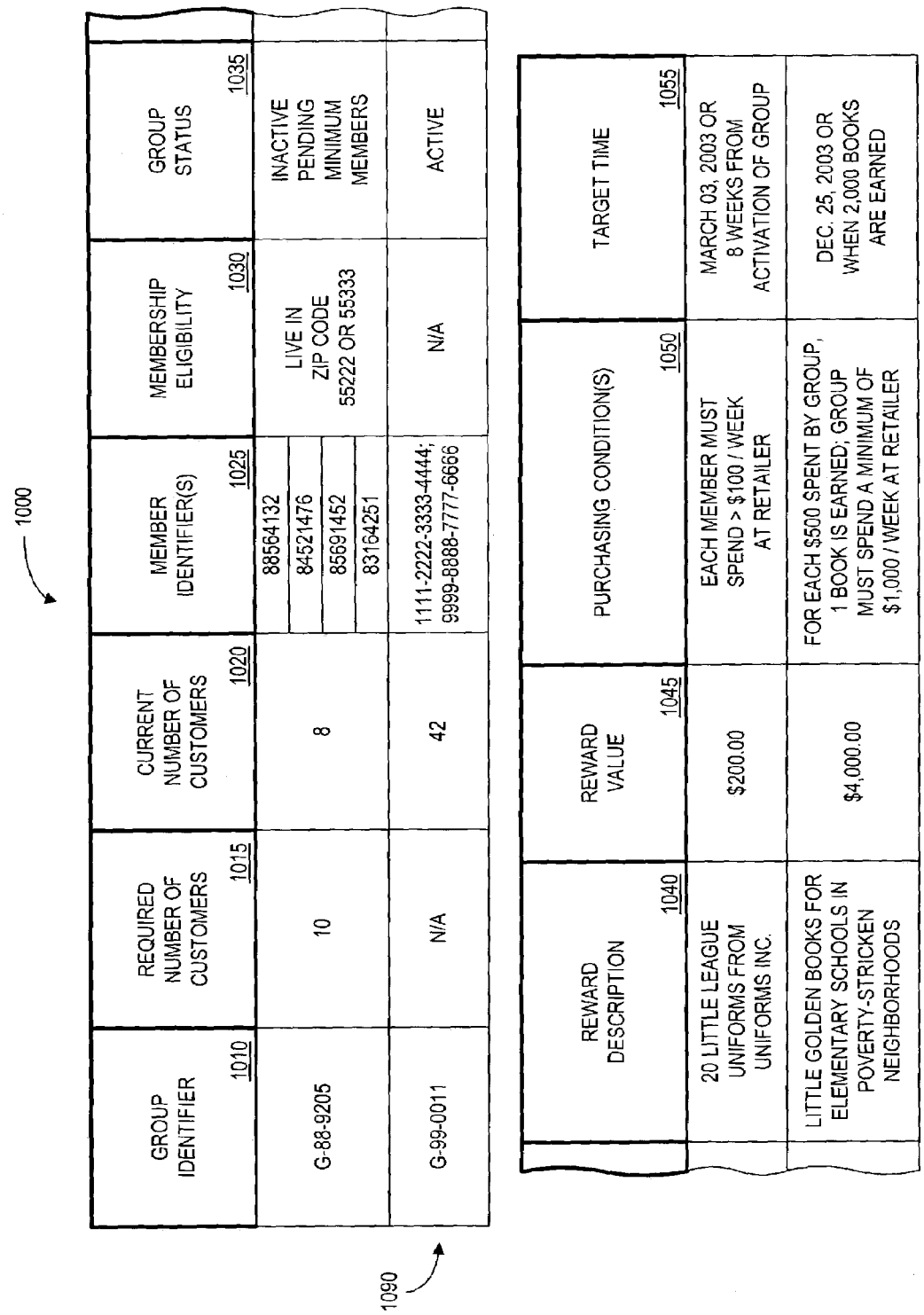
FIG. 10 is a tabular illustration of a customized reward database, in accordance with one or more embodiments of the present invention.

The system 150 includes a controller 155 that may be a controller operated by or on behalf of a retailer that has implemented a group reward system in accordance with one or more embodiments of the present invention. The controller 155 may also be operated by or on behalf of an entity other than a retailer. For example, the controller 155 may be operated by or on behalf of an entity that manages one or more group reward systems of the present invention, in which one or more retailers participates (e.g., in exchange for a fee). The controller 155 may comprise one or more computing devices operable to perform at least some of the methods of the present invention. In some embodiments, for example, the controller 155 may be a store server that is in communication with one or more point-of-sale terminals or other seller devices 170. In some embodiments the controller 155 may be a server that hosts a Web site for an online retailer or is in communication with one or more remote servers that host Web sites for one or more online retailers. The controller 155 may, for example, store information obtained from a seller device 170 and/or a customer device 180. Such information may comprise information useful in facilitating one or more group reward programs in accordance with some embodiments of the present invention. For example, the controller 155 may store some of the data illustrated as being stored in the inventory database table 400 (FIG. 4), the group database table 500 (FIG. 5), the group management database table 600 (FIG. 6), the transaction database table 700 (FIG. 7), and/or the customized reward database 1000 (FIG. 10).

In accordance with one or more embodiments of the invention, controller 155 stores and correlates purchasing data processed by one or more seller devices 170. The data is transmitted to controller 155 by the seller devices 170 through network 160. In accordance with one or more embodiments, the seller devices 170, the customer devices 160 and the controller 155 may be embodied as a single device.

Figure 2:
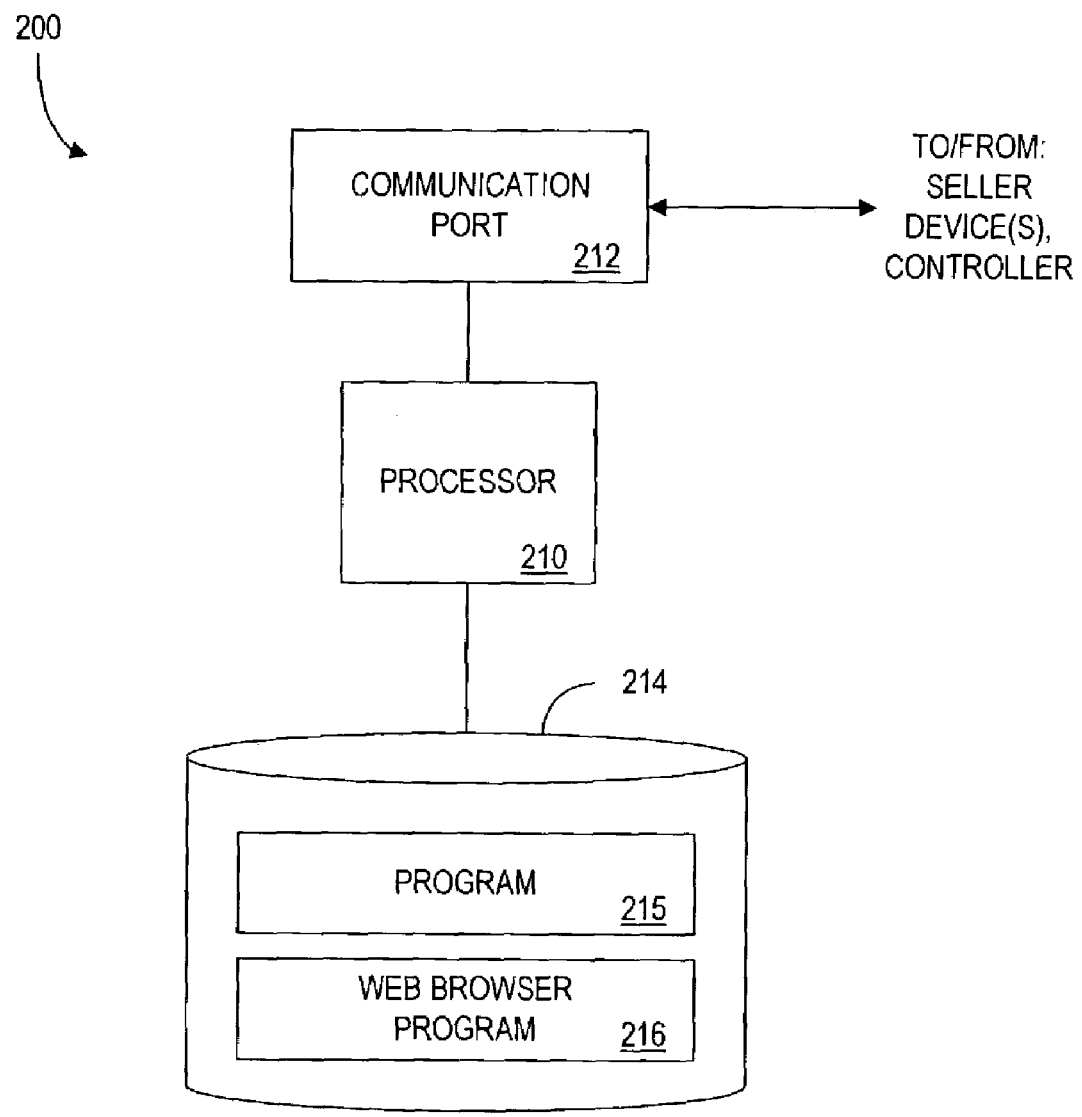
FIG. 2 is a schematic block diagram illustrating a computing device that may perform some of the functions of the system of FIG. 1A and/or the system of FIG. 1B.

Referring now to FIG. 2, a customer device 200 such as may be part of the system 100 (FIG. 1A) and/or the system 150 (FIG. 1B) is illustrated. The customer device may comprise any computing device operable to perform some of the methods of the present invention and includes a processor 210. The processor 210 may comprise one or more commonly manufactured microprocessor chips, such as the Pentium 4® manufactured by Intel Corporation™. Processor 210 may run at a clock speed determined by a clock (not shown), which may be in communication with the processor 210.

Processor 210 is in communication with communication port 212 and data storage device 214. Processor 210 may also be in communication with standard computer components such as random access memory (RAM), read-only memory (ROM), input device(s), and output device(s) (none of which are shown in FIG. 2). Random access memory (RAM) may be one or more single inline memory module (SIMM) chips capable of storing a predetermined amount of data (typically measured in megabytes) and used by processor 210 for temporary storage of processing instructions during operation. Read-only memory (ROM) may be at least one permanent non-erasable and non-rewritable memory chip that stores initializing instructions to be used by processor 210 during a start-up routine performed by customer device 200. Further functions of random access memory (RAM) and read-only memory (ROM) will be apparent to one of ordinary skill in the art.

The customer device 200 may further comprise one or more input device(s) (not shown). Input device(s) of the customer device 200 may be, for example, one or more of the following commonly known computer peripherals used for inputting data to a computing device: a keyboard, a bar-code scanner, a voice-recognition device, a biometric device, a mouse, a microphone, an electronic signature pad, and a camera. Such input device may used in combination with one or more of a parallel port, serial port, keyboard port and mouse port. Input device(s) may be operative in a manner that allows a human operator to input operating commands to the customer device 200.

The customer device 200 may further comprise one or more output device(s) (not shown). Output device(s) of the customer device 200 may be one or more of the following commonly known computer peripherals used for outputting data from a computing device: a printer, a monitor, a back-up storage device, an LED or LCD display, a radio frequency (RF) transmitter, and a speaker. Such output devices may be used in combination with one or more of a parallel or serial port. Such output device(s) of the customer device 200 may be operative such that a human operator may receive data from the customer device 200 to be used in accordance with one or more embodiments of the invention. Further applicable output devices will be apparent to one of ordinary skill in the art.

Communication port 212 may be, for example, one or more of the following commonly known computer peripherals used for computer-related communications: a parallel port, a serial port, a network card, a fax/modem/telephone port, an RF port, and the like. Further such devices will be apparent to one of ordinary skill in the art. Communication port 212 is operative to transmit and receive data between processor 210 and other computing devices.

The storage device 214 comprises an appropriate combination of magnetic, optical and/or semiconductor memory, and may include, for example, Random Access Memory (RAM), Read-Only Memory (ROM), a compact disc and/or a hard disk. The processor 210 and the storage device 214 may each be, for example: (i) located entirely within a single computer or other computing device; or (ii) connected to each other by a remote communication medium, such as a serial port cable, telephone line or radio frequency transceiver or other wired or wireless media. In one or more embodiments, the controller may comprise one or more computers that are connected to a remote server computer for maintaining databases. Storage device 214 may be, for example, any one of the following commonly known computer peripherals used for storing computer data: a hard drive, a disk drive, a DVD drive such as those manufactured by Phillips Electronics, a ZIP drive such as those manufactured by IOMEGA, a tape drive and a Digital Audio Tape drive. Further such devices will be apparent to one of ordinary skill in the art.

The storage device 214 stores a program 215 for controlling the processor 210. The processor 210 performs instructions of the program 215, and thereby operates in accordance with the embodiments of the present invention, and particularly in accordance with the methods described in detail herein. The program 215 may be stored in a compressed, uncompiled and/or encrypted format. The program 215 furthermore includes program elements that may be necessary, such as an operating system, a database management system and "device drivers" for allowing the processor 210 to interface with computer peripheral devices. Appropriate program elements are well known to those of ordinary skill in the art, and need not be described in detail herein.

According to an embodiment of the present invention, the instructions of the program 215 may be read into a main memory from another computer-readable medium, such as from a ROM to RAM. Execution of sequences of the instructions in program 215 causes processor 210 to perform the process steps described herein. In alternative embodiments, bard-wired circuitry may be used in place of, or in combination with, software instructions for implementation of the processes of the present invention. Thus, embodiments of the present invention are not limited to any specific combination of hardware and software. The storage device 214 also stores a Web Browser Program 216, which enables the customer device 200 to interface with the World Wide Web. For example, the Web Browser Program 216 may be operable to execute files associated with the World Wide Web and to perform functions associated therewith (e.g., HTTP Post functions).

Figure 3:
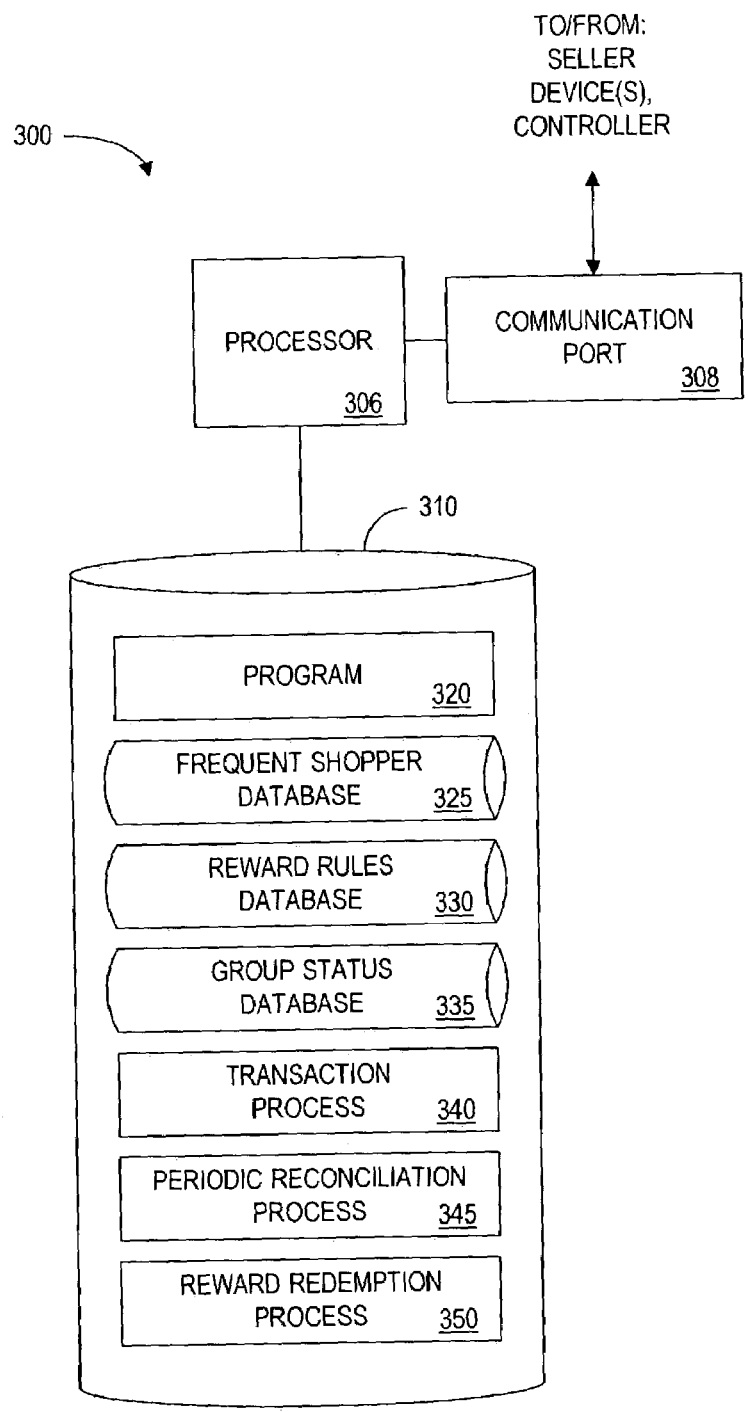
FIG. 3 is a schematic block diagram illustrating another computing device, which may be part of the system of FIG. 1A and/or the system of FIG. 1B.

Referring now to FIG. 3, controller 300 is illustrated, in accordance with one or more embodiments of the present invention. The controller 300 may be a seller device 112 (FIG. 1A), a seller device 170 (FIG. 1B), and/or the controller 155 (FIG. 1B). The controller 300 comprises a processor 306, which may comprise one or more microprocessors such as the Intel Pentium 4™ manufactured by Intel Corp.™. The processor 306 may be in communication with a clock, random access memory (RAM), read-only memory (ROM), input device(s) and output device(s) (none of which are shown in FIG. 3), which may be analogous in structure and function to those described with respect to FIG. 2. Processor 306 is also in communication with communication port 308 for facilitating communication between the processor 306 and other devices.

In accordance with one or more embodiments of the present invention, processor 306 is in communication with a storage device 310. The storage device 310 comprises an appropriate combination of magnetic, optical and/or semiconductor memory, and may include, for example, Random Access Memory (RAM), Read-Only Memory (ROM), a compact disc and/or a hard disk. The processor 306 and the storage device 310 may each be, for example: (i) located entirely within a single computer or other computing device; or (ii) connected to each other by a remote communication medium, such as a serial port cable, telephone line or radio frequency transceiver or other wired or wireless media. In one or more embodiments, the controller may comprise one or more computers that are connected to a remote server computer for maintaining databases.

The storage device 310 stores a program 320 for controlling the processor 306. The processor 306 performs instructions of the program 320, and thereby operates in accordance with one or more embodiments of the present invention, and particularly in accordance with the methods described in detail herein. The program 320 may be stored in a compressed, uncompiled and/or encrypted format. The program 320 furthermore includes program elements that may be necessary, such as an operating system, a database management system and "device drivers" for allowing the processor 306 to interface with computer peripheral devices. Appropriate program elements are well known to those of ordinary skill in the art, and need not be described in detail herein. According to an embodiment of the present invention, the instructions of the program 320 may be read into a main memory from another computer-readable medium, such as from a ROM to RAM. Execution of sequences of the instructions in program 320 causes processor 306 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The storage device 310 also stores (i) a frequent shopper database 325, (ii) a reward rules database 330, (iii) a group status database 335, (iv) a transaction process 340, (v) a periodic reconciliation process 345, and (vi) a reward redemption process 350. The databases are described in detail below and depicted with exemplary entries in the accompanying figures. As will be understood by those skilled in the art, the schematic illustrations and accompanying descriptions of any databases presented herein are exemplary arrangements for stored representations of information. Many other arrangements may be employed besides those suggested by the tables shown. Similarly, the illustrated entries of the databases represent exemplary information only; those skilled in the art will understand that the number and content of the entries can be different from those illustrated herein.

Referring to FIG. 4, a tabular representation 400 illustrates an embodiment of frequent shopper database 325. The tabular representation of the frequent shopper database includes a number of example records or entries, each of which defines a customer. Those skilled in the art will understand that the frequent shopper database may include any number of entries. The tabular representation 400 of frequent shopper database 325 also defines fields for each of the entries or records, including: (i) a frequent shopper identifier field 401, (ii) a contact information field 402, and (iii) a group identifier field 404.

In one or more embodiments, frequent shopper identifier field 401 allows for entry and storage of a plurality of frequent shopper identifiers corresponding to customers who register with a group in a group reward program. Each customer, upon registration, may be assigned a unique frequent shopper identifier. A frequent shopper identifier may be an alphanumeric code, or the like. For example, a frequent shopper identifier may be a customer's financial account identifier or a variation thereof. Alternatively, the frequent shopper identifier may be a unique code generated by the retailer, the retailer's point-of-sale terminal, the retailer's network server, and the like. Furthermore, in an embodiment where the retailer sells services on-line (i.e., over the Internet), the frequent shopper identifier may serve the purpose of being a user identifier and/or a password.

Contact information field 402 allows for entry and storage of personal identification information corresponding to the customer identified in frequent shopper identifier field 401. The personal identification information may include a customer's name, address, telephone number and/or e-mail address. Alternatively, contact information field 402 may contain personal identification information of a group leader corresponding to the group of which a customer is a member. Furthermore, contact information field 402 may contain financial account information corresponding to a financial account owned by a customer. The financial account information may be a financial account identifier such as a credit card number, a checking account number or a savings account number and the like.

The financial account information may be stored by a retailer to allow an entry fee to be charged for participation in the group reward program. Furthermore, the financial account information may allow the retailer to secure a reward given to the customer in an up-front reward embodiment. In such an embodiment, each customer in the group can secure the value of the reward with an authorization to charge, for example, his or her credit card for the customer's portion of a predetermined monetary amount (e.g., the value or cost of the reward) should the group fail to meet the program's goal. Since the reward is offered up-front, customers are better motivated to join the instant group reward program. Because the pre-issued reward is secured by the customer, he or she is further motivated to achieve the retailer's established goals, so as to avoid a penalty being charged against his or her account. It should be noted that, in embodiments wherein a reward is offered up front, once a customer satisfied the reward program's goal the customer may be provided with a second reward (which may or may not be the same as the previous reward). The customer then may or may not be required to satisfy a second goal (which may or may not be the same as the previous goal) in order to retain the second reward. In other embodiments, the financial account information may be used to credit an amount of a reward to the financial account.

Group identifier field 404 allows for entry and storage of a group identifier corresponding to the group to which a customer is assigned. Similar to the frequent shopper identifier 401, the group identifier 404 may be an alphanumeric code or the like. It should be recognized that a single customer may belong to more than one group. Thus, a customer may have one or more entries in frequent shopper database 325, each entry corresponding to a group to which the customer belongs. Alternatively, a second group identifier field may be included in tabular representation 400 for storing a second group identifier, if any, identifying a second group a customer may belong to. In yet another embodiment, the group identifier field 404 may store more than one group identifier.

Referring now to FIG. 5, a tabular representation 500 illustrates an embodiment of the reward rules database 330. The tabular representation of the reward rules database includes a number of example records or entries, each of which defines a reward that a group may earn. Those skilled in the art will understand that the reward rules database may include any number of entries. The tabular representation of the reward rules database also defines fields for each of the entries or records, including: (i) a reward identifier field 501, (ii) a reward type field 502, (iii) a reward rules field 504, (iv) reward redemption method field 506, (v) a status notification method field 508, and (vi) a reward notification method field 510.

Reward identifier field 501 allows for entry and storage of a reward identifier corresponding to a reward offered in a group reward program. The reward identifier may be an alphanumeric code or the like used by a retailer to identify a particular reward.

Reward type field 502 allows for entry and storage of a description of a reward offered in a group reward program. The reward type may be a written description of the reward. Examples of rewards offered in a group reward program include free or discounted products offered by the retailer, frequent flier miles, pre-paid telephone time, sweepstakes entries, lottery tickets, rebates, coupons or a donation to a charity or the like. Different types of rewards that a customer or group may request are described below with reference to the customized rewards embodiment.

Reward rules field 504 allows for entry and storage of a description of the rules applicable to a particular reward type by which a group becomes eligible to earn the reward in a group reward program. Examples of reward rules include a number of purchases to be made, a dollar value of purchases to be made, a number of purchases to be made within a predetermined time or before a predetermined date, a dollar value of purchases to be made within a predetermined time or before a predetermined date, specific products to be purchased, and a specific time or times during which purchases must be made. Each rule thus defines a goal that a group will attempt to meet.

A description of the reward rules may further include a description of how the performance of the group is to be measured, such as an average performance of the group, an average performance of each customer in the group, the aggregate performance of the group or the individual performance of each customer in the group. Further methods for measuring a performance of the group are disclosed in co-pending U.S. patent application Ser. No. 08/948,144 filed on Oct. 9, 1997, issued Oct. 3, 2000 as U.S. Pat. No. 6,128,599.

Additionally, a description of the reward rules may further include a description of the type of transactions made by a customer that are qualified under a group reward program. A "qualified transaction," as contemplated by the instant invention, is a purchase that is counted when measuring the purchasing performance of a group participating in a group reward program. Examples of qualified transactions include: a purchase over $10.00, a purchase in which the payment is made by cash or debit card, a purchase made within a predetermined time frame, a purchase made at a particular location or online, or a purchase of specific goods or services. Other types of qualified transactions will be apparent to those of ordinary skill in the art.

Reward redemption method field 506 allows for entry and storage of a description of the method by which a reward is to be redeemed in a group reward program. Such methods include a receipt issued to each customer in a group printed at a point-of-sale terminal printer, a check issued to a group leader, an automatic discount applied by a point-of-sale terminal during each group member's next purchase subsequent to reward eligibility, and the like. In one or more embodiments where the retailer provides for the sale of products and services online, the reward method may include the issuance of an electronic mail message, an electronic coupon and the like.

Status notification method field 508 allows for entry and storage of a description of a method by which customers may be notified of their eligibility to receive a group reward. Examples of status notification methods include a printout or receipt from a point-of-sale terminal at the time of a customer's transaction, a communication via electronic mail or the Internet, a facsimile transmission, automated or manual telephone messaging, a postal communication or a messaging system accessible via a point-of-sale display located in the retailer's place of business, on a credit card statement or bill, or any other medium. The status notification method may allow a group to check its purchasing performance data in one of several manners. For instance, a status report may be issued at regular time intervals or upon request of any one of the customers in the group. The status report can be issued to a registered group leader who then may inform the remaining group members of the group's status. Alternatively, the status report can be issued to each member of the group. In addition, status notification may be performed by one or more of the seller devices 112 (FIG. 1A), one or more of the seller devices 170 (FIG. 1B), and/or the controller 155 (FIG. 1B).

Reward notification method field 510 allows for entry and storage of a description of a method by which a group is notified when they become eligible to receive a group reward. Reward notification methods may be performed in the same manner as status notification methods described above.

Referring to FIG. 6, a tabular representation 600 illustrates an embodiment of the group status database 335. The tabular representation 600 of the group status database 335 includes a number of example records or entries, such as record 650 and record 655, each of which defines a group. Those skilled in the art will understand that the group status database may include any number of entries. The tabular representation 600 of the group status database 335 also defines fields for each of the entries or records, including: (i) a group identifier field 601, (ii) a reward identifier field 602, (iii) a reward status field 603, (iv) a frequent shopper identifier field 604, (v) a status field 605, and (vi) a group leader identifier field 606.

Group identifier field 601, reward identifier field 602 and frequent shopper identifier field 604 may contain some or all of the same or similar information as described for group identifier field 404 (FIG. 4), reward identifier field 501 (FIG. 5) and frequent shopper identifier field 401 (FIG. 4), respectively. It will be apparent to one of ordinary skill in the art that the information in fields 404, 501, and 401 can be stored in group status database 335 independently of the corresponding fields appearing in frequent shopper database 325 and reward rules database 330. However, for illustrative purposes these fields are written simultaneously as cross-related database fields, a technique which is well known in prior art database systems.

Reward status field 603 allows for entry and storage of a description of the current status of a customer of a corresponding group participating in a group reward program. The status of each customer in a group may be the information that is reported to a customer or a group through the previously described status notification method. The entries in reward status field 603 may be determined in accordance with the reward rules applicable to the group. For example, if the reward rules dictate that a group must make a certain dollar amount of purchases within a month, then the reward status field may, for each customer, indicate that customer's dollar value of purchases for that month. In other embodiments the reward status field 603 may store information in a format that does not correspond as clearly to the reward rules associated with the group. For example, the reward status field 603 may store pointers to transaction data in a separate transaction database.

Furthermore, the data stored in reward status field 603 may reflect either the performance of each customer in the group, a subset of customers in the group, or the performance of the group overall. In an embodiment where the stored data reflects the performance of the customer, as exemplified by records 650 and 655, the purchasing data for a customer may be updated and recorded in reward status field 603 each time a customer makes a qualified transaction, as discussed in accordance with transaction process 340. In other embodiments, the data in reward status field 603 may be updated on a periodic or non-periodic basis. As will be apparent to one of ordinary skill in the art, such embodiments are particularly useful where the performance of the group is measured based on the individual or average performance of each group member.

In an embodiment where the stored data reflects the performance of the group, as exemplified by the third and fourth rows of FIG. 6, when a customer in a group makes a qualified purchase, the performance of the group may be recalculated by retrieving the stored performance from reward status field 603 and adding the current purchase to the stored performance. The new value is then stored in reward status field 603 for each customer in the subject group. As will be apparent to one of ordinary skill in the art, this embodiment is particularly useful where the performance of the group is measured as an aggregate performance of the group.

Status field 605 allows for entry and storage of a description of the status of a group's eligibility, whether the group has been notified and whether a reward has been redeemed.

Group leader identifier field 606 allows for entry and storage of a group leader identifier and is utilized in embodiments wherein one of the members of a group is designated as the leader or representative (e.g., the person via whom communications between the retailer or other entity and the group occur) of the group. The group leader identifier may be, for example, the frequent shopper identifier corresponding to the customer who is registered as a leader of a group. Alternatively, the group leader identifier may be a separate alphanumeric code, or the like.

Figure 7A:
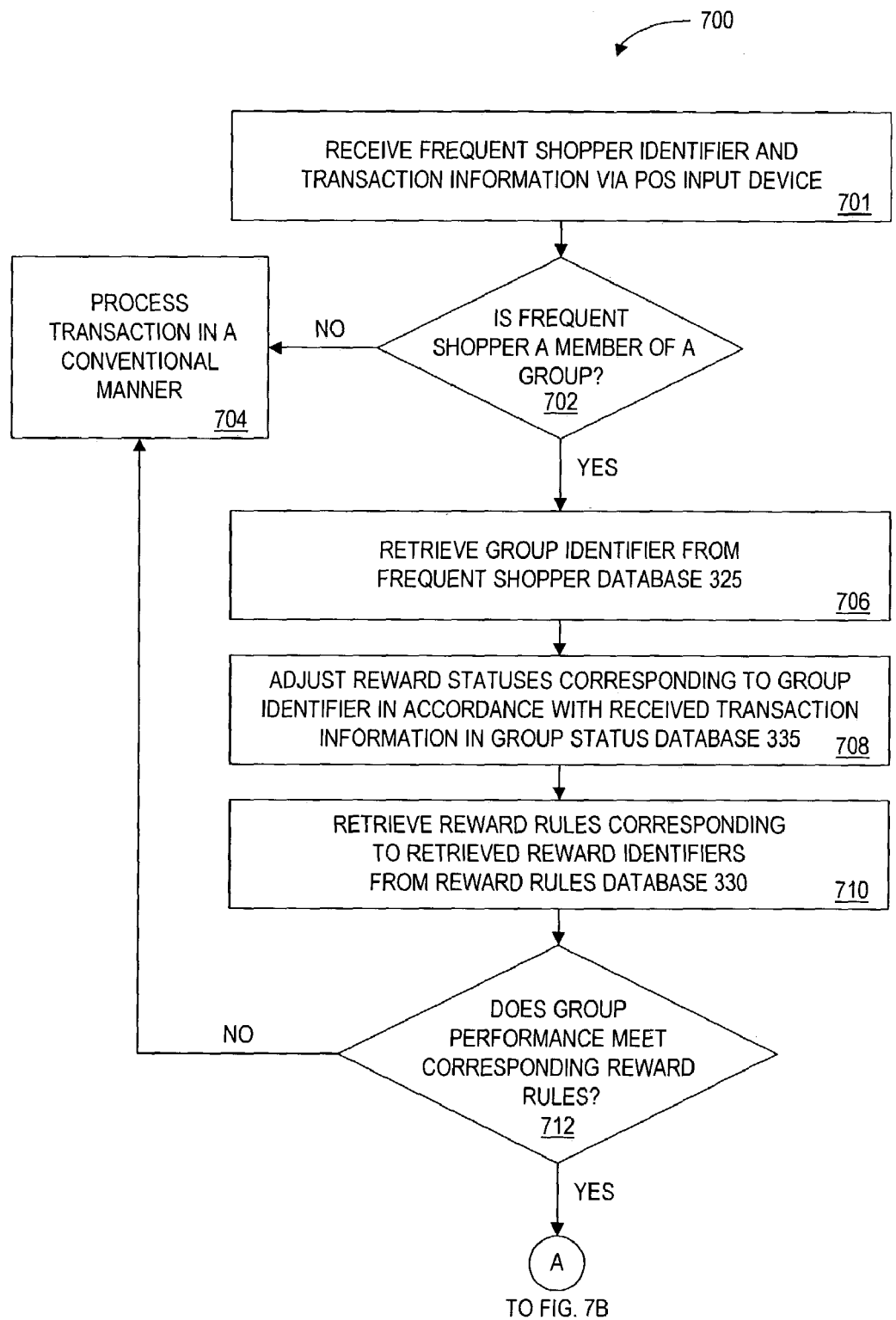
FIGS. 7A–7C show a flow chart illustrating the steps used to process a transaction in accordance with one or more embodiments of the present invention.
Figure 7B:
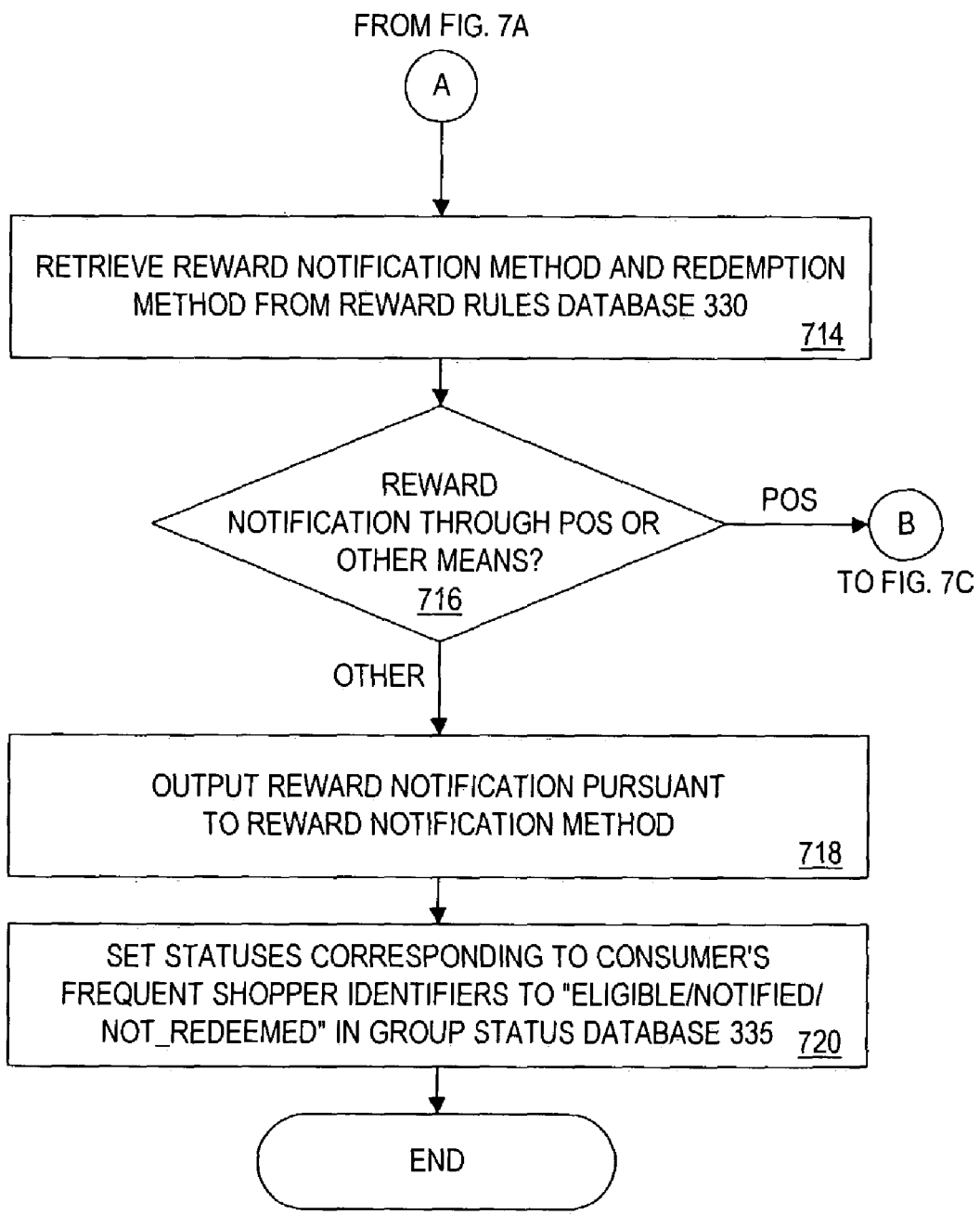
Figure 7C:
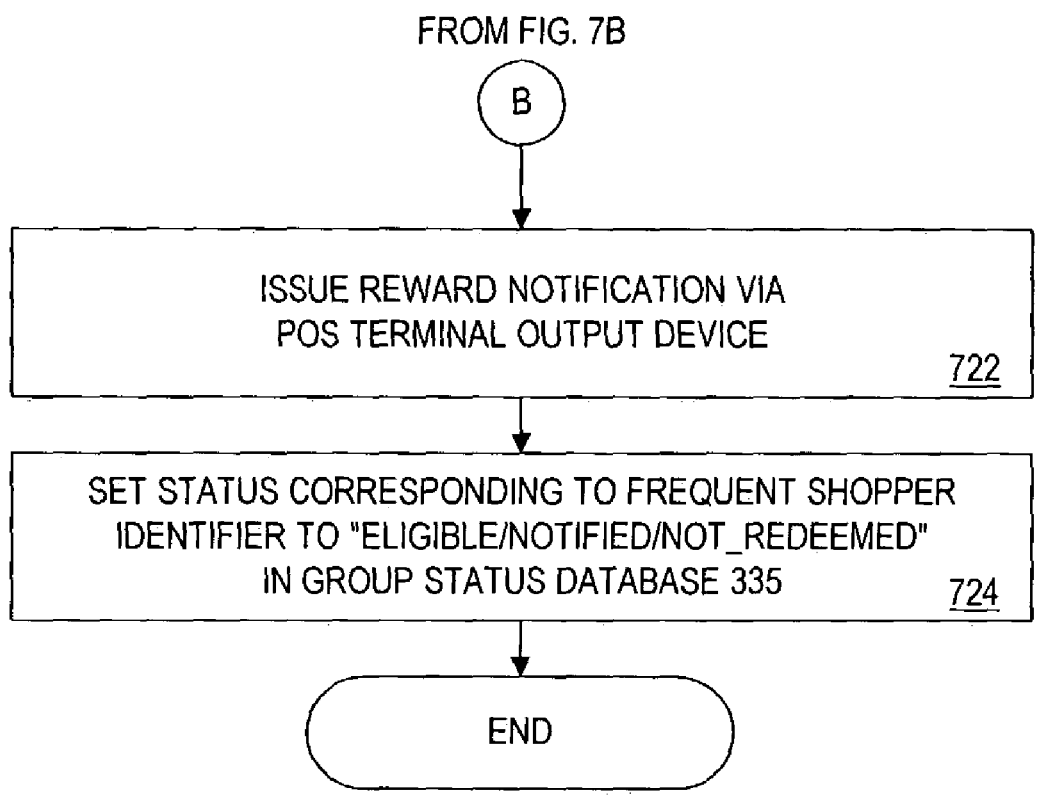

FIGS. 7A–7C are a flowchart illustrating a process 700 of processing a transaction with a customer. Process 700 is an embodiment of the transaction process 340 of the invention. It should be noted that the process 700 may be performed by or on behalf of a brick-and-mortar retailer and/or an online retailer. For purposes of brevity, the process 700 will be described herein as being performed by or on behalf of a brick-and-mortar retailer and involving a point-of-sale terminal. It should be noted that although some of the steps of process 700 are described herein as being performed by a point-of-sale terminal while other steps are described herein as being performed by another computing device, any and all of the steps may be performed by a single computing device which may be a point-of-sale terminal or another computing device. Further any steps described herein as being performed by a particular computing device may be performed by a human or another computing device as appropriate. Transaction process may be performed for each transaction at a retailer or on another periodic or non-periodic basis.

Referring now to FIG. 7A, prior to the initialization of transaction process 700, a customer selects one or more items offered for sale by a retailer. The customer presents the item(s) at, for example, a point-of-sale terminal along with his or her frequent shopper identifier during the transaction. In an online embodiment the customer may cause a representation of the item to be placed in the customer's virtual basket and select the "checkout" link of the Web site, thereby initializing the checkout process of the online retailer. For purposes of brevity, process 700 will be described herein as taking place at a point-of-sale terminal in a brick-and-mortar store.

Transaction process 700 begins with step 701, wherein an operator of a point-of-sale terminal receives a frequent shopper card or other identifier from the customer and inputs the frequent shopper identifier and transaction information into the point-of-sale terminal. At step 702, the point-of-sale terminal, to determine whether the customer is a member of a registered group, queries a computing device such as a point-of-sale network server. The computing device may comprise, for example, one or more of the seller devices 112 (FIG. 1A), one or more of the seller devices 170 (FIG. 1B), and/or the controller 155 (FIG. 1B). As noted above, in some embodiments the point-of-sale terminal that receives the transaction information and the frequent shopper identifier may also process the entirety of the process 700 by having all the necessary data stored therein. The computing device that receives the frequent shopper identifier and the transaction data (e.g., through a communication port) may search the frequent shopper identifier field 401 of frequent shopper table 400 for a matching frequent shopper identifier. If a match is not found, the transaction is processed in a conventional manner (step 704), i.e., the transaction is processed without any adjustments being made to group status table 600. If a match is found then a customer is identified by the received frequent shopper identifier and the process 700 continues on to step 706.

At step 706, the computing device retrieves the group identifier corresponding to the customer from group identifier field 404 of frequent shopper table 400. The group identifier in turn indicates a record of the group status table 600 that corresponds to the customer. At step 708, the computing device adjusts the reward status corresponding to the customer stored in reward status field 603 according to the transaction data received from the point-of-sale terminal. At step 710, the computing device retrieves the reward identifier stored in reward identifier field 501 corresponding to the customer and looks up the reward rule in reward rules field 504.

At step 712, the computing device retrieves all the reward statuses stored in reward status field 603 that correspond to the customer's group. The computing device correlates the retrieved reward statuses to determine the performance of the group and compares the performance of the group to the reward rules. If the group performance does not at least equal the goal specified by the reward rules, the remainder of the transaction is processed in a conventional manner (step 704). If the group performance does at least equal the goal specified by the reward rules, process 700 continues on to step 714.

For example, if the reward rules state that the aggregate performance for the group must exceed $1,000.00 of purchase totals in a month, the computing device retrieves the reward statuses for each customer in the group. As discussed above, the reward statuses may be stored in the same format as the reward rules. In this example, as a dollar value of purchases made by the customer in the current month. The computing device will then, in accordance with the aggregate group performance rule, sum the dollar values of purchases made by each member of the group to determine a group performance. If the performance exceeds $1,000.00, the computing device will determine that the group is eligible to receive the reward. If the performance does not exceed $1,000.00, the computing device will determine that the group is not eligible to receive the reward.

Referring now to FIG. 7B, at step 714, the computing device retrieves the reward notification method stored in reward notification method field 510 that corresponds to the reward type assigned to the customer's group. At step 716, the computing device determines whether the reward notification is to be performed at the point-of-sale terminal. If so, process 700 continues at step 722, discussed below. If not, transaction process 700 continues at step 718.

At step 718, the computing device outputs the reward notification pursuant to the reward notification method corresponding to the reward for which a group is eligible. At step 720, the computing device sets the status in status field 605 to "eligible/notified/not_redeemed" for each customer in the group, at which point transaction process 700 ends.

Referring to FIG. 7C, if transaction process 700 continues to step 722, the computing device sends a signal to the point-of-sale terminal. Upon receipt of the signal, the point-of-sale terminal issues a reward notification to the customer (e.g., via an output device associated with the point-of-sale terminal). The computing device then sets the status in status field 605 to "eligible/notified/not_redeemed" for each customer in the group (step 724), at which point transaction process 700 ends. In an alternate embodiment, the reward may be applied simultaneously at the point of notification. For example, if the reward is a discount, the discount may be applied to the current transaction that is the transaction which qualified the customer for the reward. In such embodiments the purchase total which qualified the customer and/or group for the reward may be reduced based on the discount and the customer asked to pay only the discounted purchase total amount.

Figure 8A:
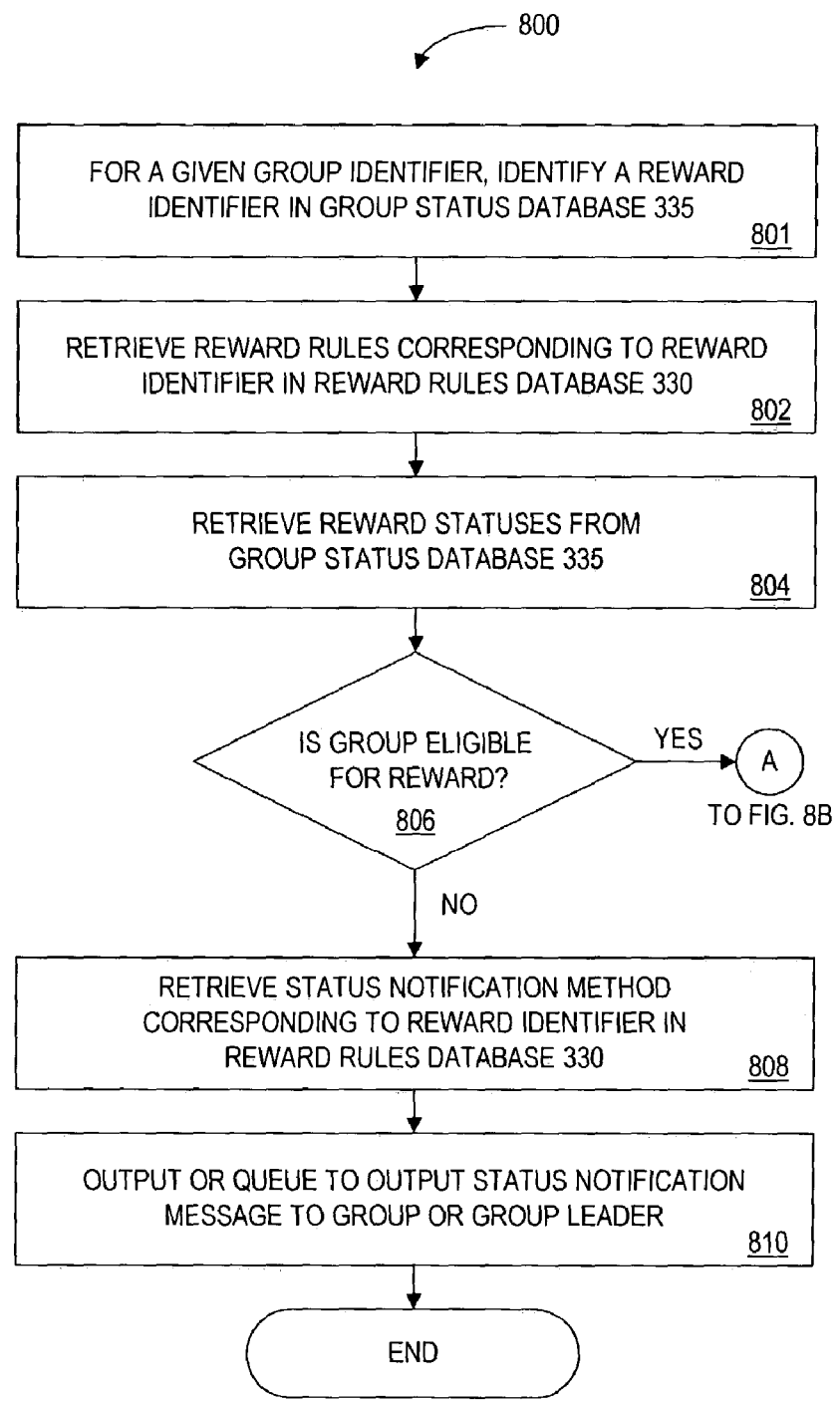
FIGS. 8A–8B show a flow chart illustrating the steps used to update the databases shown in FIGS. 4–6, in accordance with one or more embodiments of the present invention.
Figure 8B:
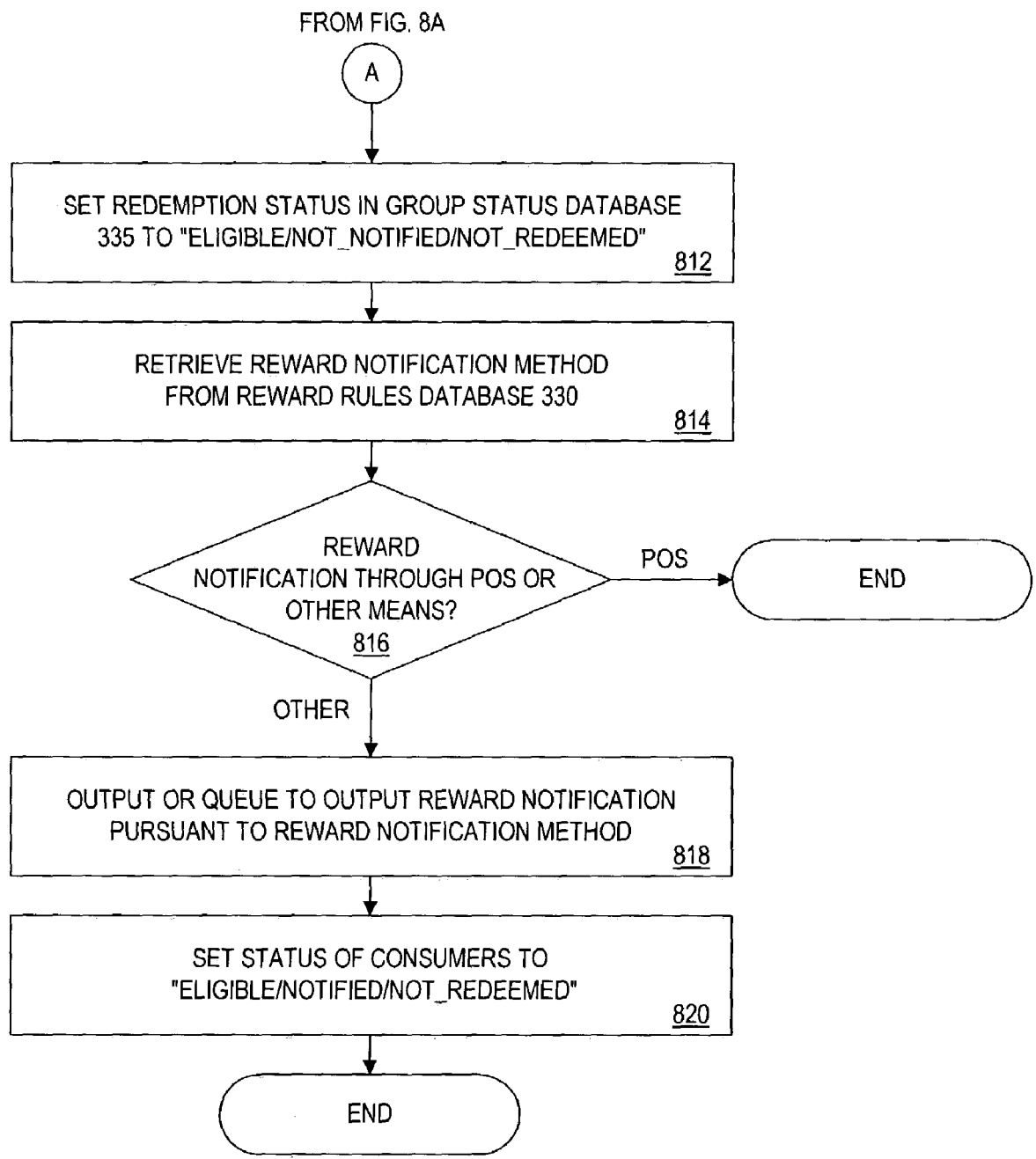

FIGS. 8A and 8B illustrate a periodic reconciliation process 800 performed by a computing device (e.g., one or more of the seller devices 112, one or more of the seller devices 170, and/or controller 155) for one or more of the group identifiers stored in group status table 600. The periodic reconciliation process 800 is an illustration of one embodiment of the periodic reconciliation process 345.

Referring now to FIG. 8A, the process 800 is initialized with step 801, wherein for a given group identifier, the computing device searches for a reward identifier stored in reward identifier field 501 that corresponds to the group identifier. At step 802, the computing device retrieves the reward rules stored in reward rules field 504 corresponding to the reward identifier. At step 804, the computing device retrieves all reward statuses that correspond to the group identifier from reward status field 603 and determines the group performance, as discussed previously.

At step 806, the computing device determines whether the group is eligible to receive a reward by reading the status retrieved in step 804. If the group is eligible to receive the reward, periodic reconciliation process 800 continues to step 812 discussed in conjunction with FIG. 8B below. If the group is not eligible to receive the reward, periodic reconciliation process 800 continues at step 808.

At step 808, the computing device retrieves a status notification method corresponding to the reward identifier or identifiers assigned to the group from status notification method field 508. At step 810, the computing device outputs or queues to output a status report (e.g., through an output device or communication port associated with the computing device). The status report may be communicated to the group leader or to each member of the group, in accordance with the reward notification method assigned to the group. After step 810, periodic reconciliation process 800 ends.

Referring now to FIG. 8B, if the computing device determines that the group is eligible to receive the reward at step 806, periodic reconciliation process 800 continues at step 812. At step 812, the computing device updates status field 605 corresponding to the group to "eligible/not_notified/not_redeemed" for each customer corresponding to the group. At step 814, the computing device retrieves the reward notification method corresponding to the reward assigned to the group from reward notification method field 510. At step 816, the computing device determines whether the reward notification is to be performed through a point-of-sale terminal. If so, periodic reconciliation process 800 ends. If not, periodic reconciliation process 800 continues at step 818.

At step 818, the computing device outputs the reward notification pursuant to the reward notification method corresponding to the reward assigned to the group. The outputting function may include a process for storing the status for later outputting, as will be apparent to one of ordinary skill in the art. At step 820, after the reward notification has been output through an output device(s) or communication port, the computing device sets status field 605 to "eligible/notified/not_redeemed" for each customer in the group. After step 820 has been completed, periodic reconciliation process 800 ends.

Figure 9A:
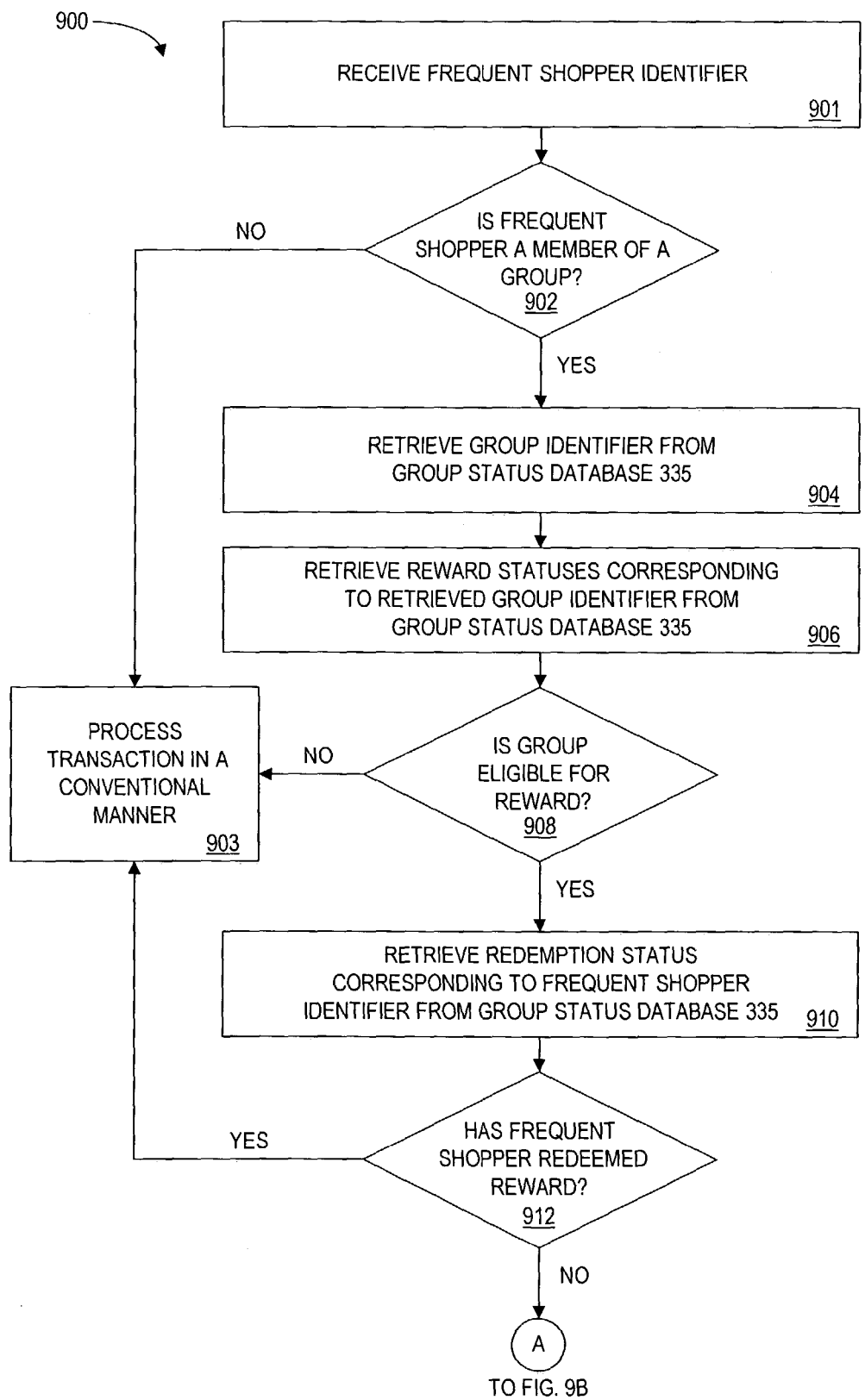
FIGS. 9A–9B show a flow chart illustrating the steps used for processing a reward redemption, in accordance with one or more embodiments of the present invention.
Figure 9B:
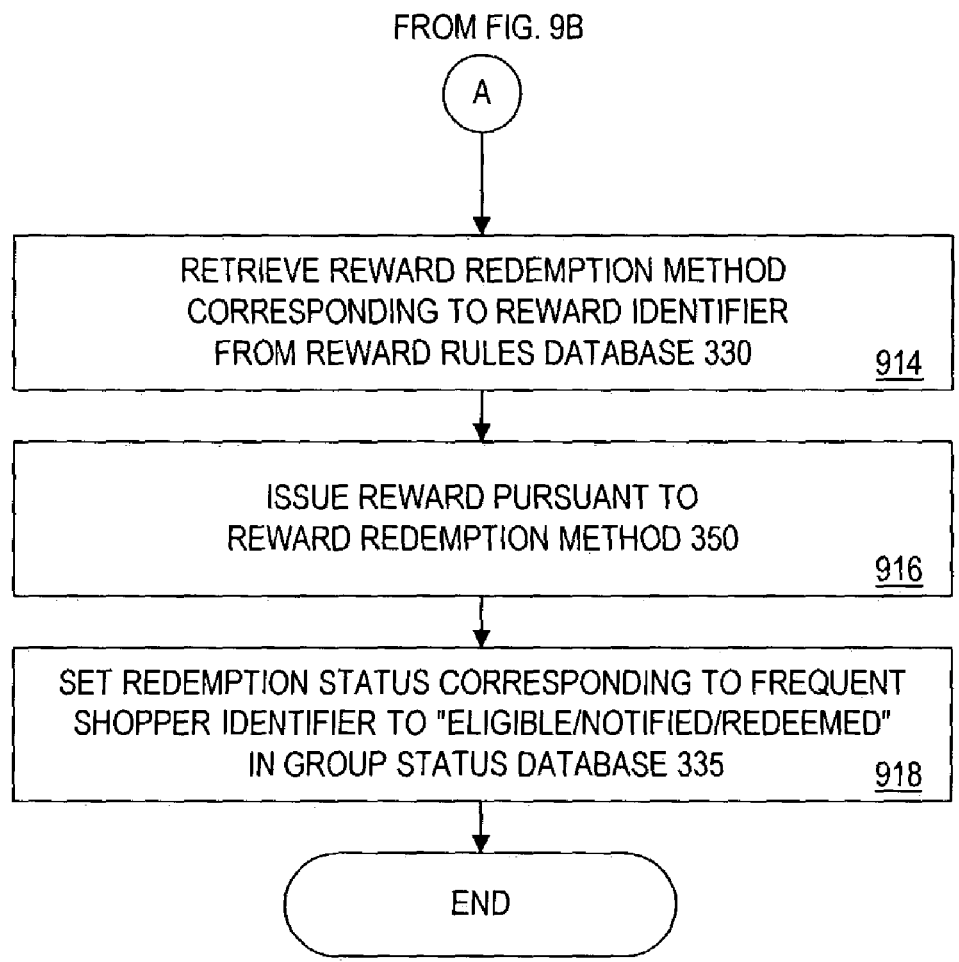

FIGS. 9A–9B are a flow chart illustrating a reward redemption process 900 performed by a computing device. The computing device may comprise one or more of the seller devices 112, one or more of the seller devices 170, and/or controller 155. It should be noted that the computing devices described with reference to FIGS. 7A–7C, FIGS. 8A–8B, and FIGS. 9A–9B may or may not be the same computing device. The process 900 is an illustration of one embodiment of the reward redemption process 350. The process 900 may be performed by or on behalf of a brick-and-mortar retailer and/or an online retailer. For purposes of brevity, the process 900 will be described herein as being performed by or on behalf of a brick-and-mortar retailer and involving a point-of-sale terminal. It should be noted that although some of the steps of process 900 are described herein as being performed by a point-of-sale terminal while other steps are described herein as being performed by another computing device, any and all of the steps may be performed by a single computing device which may be a point-of-sale terminal or another computing device.

The process 900 is typically initialized when a customer presents his or her frequent shopper card at a retailer's point-of-sale terminal during a transaction, but may be performed at any time after a group becomes eligible to receive a reward.

At step 901, the computing device receives a frequent shopper identifier (e.g., transmitted from point-of-sale terminal through network such as network 114, network 160 and/or network 165). At step 902, the computing device determines whether the frequent shopper identifier corresponds to a customer belonging to a frequent shopper group by looking up the frequent shopper identifier in frequent shopper table 400. If the frequent shopper identifier is not found in frequent shopper table 400, reward redemption process 900 proceeds to step 903 where the transaction with the customer is processed in a conventional manner after which time reward redemption process 900 ends.

If the frequent shopper identifier is found in frequent shopper table 400, reward redemption process 900 continues on to step 904. At step 904, the computing device retrieves the group identifier corresponding to the frequent shopper identifier from frequent shopper table 400. At step 906, the computing device retrieves the reward status corresponding to the retrieved group identifier from group status table 600. At step 908, the computing device determines the reward status data and compares the results to the reward rules stored in reward rules table 500 to determine whether the group is eligible to receive the group reward. If, for example, the determined reward status data meets or exceeds the reward rules stored for the group's reward type, frequent shopper table 400 proceeds to step 910. If not, the remainder of the transaction with the customer is processed in a conventional manner and reward redemption process 900 ends.

At step 910, the computing device retrieves the redemption status corresponding to the received frequent shopper identifier from group status table 600. At step 912, if the redemption status indicates that the group reward has been redeemed, the remainder of the transaction with the customer is processed in a conventional manner and reward redemption process 900 ends. If the redemption status indicates that the reward has not been redeemed, reward redemption process 900 continues at step 914.

Referring now to FIG. 9B, after determining that the reward has not been redeemed by an eligible customer, the computing device retrieves the reward redemption method corresponding to the reward identifier associated with the customer's group from reward rules table 500 (step 914). At step 916, the computing device issues the reward pursuant to the retrieved reward redemption method. At step 918, the computing device sets the redemption status corresponding to the frequent shopper identifier in group status table 600 to "eligible/notified/redeemed" at which time reward redemption process 900 ends.

The invention disclosed herein creates a self-sustaining promotion for retailers by encouraging a plurality of customers at a time to participate in a frequent shopper program. This invention, therefore, provides advantages over prior art frequent shopper programs in that customers in a group registered as a shopping group can encourage each other to work for the common goal necessary to be eligible for a group reward. The customers therefore have more of a motivation to meet a purchasing goal than in previous programs.

Since customers are better motivated in the instant program, there will be more compliance with the program, thereby generating more profits for a retailer implementing the program. Hence, smaller retailers having smaller budgets may implement this invention with more success than with prior art frequent shopper programs because of the greater expected returns. Thus, smaller retailers are better able to take advantage of the instant frequent shopper program than those offered in the prior art. A further advantage of the present invention is that, in the up-front reward issuance embodiment discussed above, a customer is better motivated to join the instant frequent shopper program and is better motivated to achieve the purchasing goals established by the retailer than in prior art frequent shopper programs.

The group reward program described above may include additional features described hereinbelow. For example, the retailer may require each customer, upon registration, to provide financial account information corresponding to a financial account owned by the customer. The financial account information may include a financial account identifier, such as a credit card number corresponding to a credit card account, or a checking account number corresponding to a checking account owned by the customer.

In one embodiment, an entry fee for participating in the group reward may be charged against the financial account. In a second embodiment, a penalty may be charged against the account when a customer or a group fails to meet the purchasing goals set by the retailer for the group reward program. In an up-front reward embodiment, the customer may be provided with a group reward upon registration. The value of the group reward may be secured by an open authorization to charge a penalty, corresponding to either the value of the reward or a portion of the value of the reward, against the financial account should the customer and/or the group fail to meet the purchasing goal established by the retailer. Further uses of the financial account will be apparent to one of ordinary skill in the art.

Customized Group Rewards

In accordance with one or more embodiments of the present invention, a request may be submitted to a retailer from one or more customers representing a group of customers, wherein the request comprises an indication of a reward the group desires to earn in exchange for completing purchases at the retailer. A reward (in a customized reward embodiment or any other embodiment of the present invention) may comprise, for example, (i) one or more products, (ii) one or more units of a product, (iii) an amount of money, (iv) an amount of alternate currency (e.g., merchant-specific currency or gift certificates), (v) one or more provisions of a service, or (vi) a combination thereof. For example, a group of parents may desire to earn a set of little league uniforms for their children. A customized reward, as used herein, is a reward requested by one or more customers by submitting a description of the reward to a retailer or other entity practicing aspects of the present invention, and for which the retailer or other entity determines conditions that have to be satisfied by the one or more customers. The conditions may be determined via a negotiating process between the one or more customers comprising the group and the retailer or other entity practicing aspects of the present invention.

It should be noted that a request for a reward may be received from a single customer (e.g., acting on behalf of a group of customers) or may be received from a plurality of customers acting cooperatively (e.g., each of the customers of the group or a subset of the customer of the group). Alternatively, a request for a reward may be received from a person or entity that is not a customer of a retailer and/or does not intend to be a member of any resultant group that will attempt to earn the reward.

Receiving a request for a reward will be referred to herein as receiving a request "from the group". Receiving a reward "from a group" or "from the group", as used herein, encompasses both embodiments where a request is received from a single customer (e.g., representing a group of customers and/or wishing to establish or attract a group of customers) and embodiments where a request is received from a plurality of customers, unless specified otherwise.

A request for a reward may be submitted by one or more customers to a retailer or other entity via, for example, a computing device. For example, one or more customers may submit a request for a reward via a Web site operated by or on behalf of one or more retailers. Such a Web site may include an electronic form on which the one or more customers may type a description of a desired reward and/or one or more menus from which the one or more customers can provide information regarding the desired reward. For example, a customer may indicate a category of a reward by selecting a category from a menu of available categories. Alternately, a customer may submit a request for a reward via a kiosk or other computing device terminal located in a retail store or other establishment. In one or more embodiments a customer may submit a request for a reward at a point-of-sale terminal of a retail store. For example, a customer may verbally inform an operator of a point-of-sale terminal of a desired reward and the operator may input the information into the point-of-sale terminal or another device associated with the point-of-sale terminal. Alternately, an input device associated with a point-of-sale terminal may be provided for use by a customer in providing a request for a reward. In alternate embodiments a customer may fill out a paper application for a reward or write down a description of a desired reward and provide it to a retailer or other entity (e.g., by mailing it, handing it to an employee, or dropping it into a designated container).

The request received from the group may comprise a description of the reward. The description may include, for example, (i) an identity of one or more entities that provides the reward, (ii) an identity of one or more entities that manufactures the reward, (iii) a retail price of the reward, (iv) a wholesale price of the reward, (v) one or more desired characteristics of the reward (e.g., a color, size, composition, place of origin), (vi) number of units of the reward (in embodiments where the reward comprises a product) or number of provisions of a service, (vii) a time by which the group desires to earn the reward, and/or (viii) an indication of a desired quality of the reward (e.g., reservations at a five star hotel vs. reservations at a four star hotel). In response to the request, the retailer determines one or more conditions that the group must satisfy in order to earn the reward. How a retailer may determine such one or more conditions is described below, with reference to FIGS. 11A and 11B.

It should be noted that, in accordance with one or more embodiments, a request for a reward may be submitted to, or received by, an entity other than a retailer at which the group is to complete purchases in order to earn the reward. For example, applicants envision a business one of the functions of which is to receive such requests for rewards. Such a business may forward the requests to the appropriate retailer(s) for a determination of conditions the group would have to satisfy or may determine the conditions itself (e.g., based on instructions or rules received from the retailer(s)). For example, in one or more embodiments such a business may act as a liaison between groups of customers and one or more retailers. In some embodiments a group may be required to complete purchases at a plurality of specified retailers in order to earn a desired reward. It should also be noted that a reward, in accordance with one or more embodiments, may comprise a product and/or service that is not normally offered for sale by a retailer at which the group will be required to complete purchases in order to earn the reward.

As described above, in accordance with one or more embodiments, the request for a reward may specify a time by which the group desires to earn the reward. Alternatively, in one or more embodiments, the retailer or other entity practicing aspects of the present invention may specify the time by which the group may earn the reward, based on other information included in the request for the reward, as one of the conditions of earning the reward. The retailer or other entity may, in response, determine one or more conditions the group would have to satisfy in order to earn the requested reward. The request for a reward from a group may include an indication of the cost of the reward to the retailer and/or information which enables the retailer to determine the cost of the reward.

In accordance with one or more embodiments, the request for a reward may specify a number of customers comprising the group. For example, the request may specify that ten (10) individuals comprise the group and are available for completing purchases in exchange for the reward. In some embodiments the retailer or other entity practicing aspects of the present invention may specify a minimum or particular number of customers that are required to be in the group as one of the condition(s) for earning the reward. For example, a customer may submit a request that he or she would like to earn a specified reward (e.g., a $1,000 donation to a specified charity). In response, the customer may be informed that a group of at least ten (10) customers completing purchases in accordance with one or more specified conditions would be required to earn the specified reward. In such embodiments the customer who submitted the request for the reward may be required to solicit additional customer(s) for forming the group. Alternatively, the retailer or other entity negotiating with the customer for the reward may be responsible for soliciting additional customer(s) to complete the group in addition to or in lieu of solicitation by the customer. For example, the retailer(s) at which the purchases must be completed may communicate an invitation to join the group and help earn the reward to one or more other customers. Details of various methods of communicating such an invitation are described in more detail below.

The one or more conditions which a group must satisfy in order to earn a reward may comprise purchasing conditions. Purchasing conditions define purchases the group must complete in order to earn the reward. As described above, purchasing conditions may specify, for example, (i) a number of purchases that must be completed, (ii) a value of purchases that must be completed (e.g., a value of an individual purchase of a plurality of purchases or an aggregate value of a plurality of purchases), (iii) a frequency of purchases, (iv) one or more particular times at which one or more purchases must be completed, (v) one or more products to be included in at least one purchase, and/or (vi) a particular method via which one or more purchases must be completed (e.g., online vs. a brick-and-mortar store of a retailer and/or by payment with a particular credit card).

A particular condition may or may not apply to each customer comprising a particular group of customers. For example, in accordance with some embodiments, a first condition must be satisfied by a first customer of a group while a second condition must be satisfied by a second customer of the group. Further, the first purchasing condition may or may not be different from the second purchasing condition.

In accordance with one or more embodiments, a purchasing condition specified for a group must be satisfied by each individual member of the group. For example, if a purchasing condition requires a purchase of at least $100 every week for six weeks, each customer comprising the group may be required to spend at least $100 per week for six weeks at the retailer(s) at which the purchases must be completed. Alternatively, in one or more embodiments, a purchasing condition may apply to the group as a whole and may be satisfied by aggregating purchases made by the group members. For example, the purchasing condition just discussed may be satisfied in some embodiments if at least one customer of the group spends at least $100 per week for six weeks at the retailer (e.g., it may or may not be the same customer making the purchase(s) each week). In such embodiments it may also be sufficient to meet the purchasing condition if the aggregate value of purchases made by members of a group is $100 each week for six weeks. Other variations of how a group of customers may satisfy purchasing conditions in accordance with the present invention are envisioned and the above examples are not meant to be limiting in any manner but submitted for illustrative purposes only.

Referring now to FIG. 10, a tabular representation 1000 of a customized reward database is illustrated, in accordance with one or more embodiments of the present invention. A customized reward database may be maintained in a computing device operated by or on behalf of a retailer or another entity practicing aspects of the present invention. The computing device may comprise, for example, one or more of the seller devices 112 (FIG. 1A), one or more of the seller devices 170 (FIG. 1B), and/or the controller 155 (FIG. 1B). The tabular representation 1000 of the customized reward database includes a number of example records or entries, each of which defines a customized reward. Those skilled in the art will understand that the customized reward database may include any number of entries. The tabular representation 1000 of customized reward database also defines fields for each of the entries or records. The fields specify: (i) a group identifier 1010, (ii) a required number of customers 1015, (iii) a number of customers that are currently members of the group 1020, (iv) member identifier(s) 1025, (v) membership eligibility 1030, (vi) group status 1035, (vii) reward description 1040, (viii) reward value 1045, (ix) condition(s) 1050, and (x) target date 1055.

A group identifier 1010, as well as other identifiers described herein, may be generated or assigned by the computing device, or may be established by one or more customers (e.g., members of the subject group) and provided to the computing device by way of a customer device, seller device or other appropriate device. For example, the group identifier may comprise a numeric code that is assigned to the corresponding group by the computing device. Alternatively, the group identifier may comprise a user name and/or password that may be generated by a customer device and/or a seller device and subsequently provided to the computing device. The group identifier 1010 may be based on one or more identifiers that identify one or more customers included in the group.

The required number of customers field 1015 stores an indication of the minimum, maximum, or specific number of customers required in order for the group to be able to earn the reward. Such a field may be included in the one or more embodiments in which the retailer or other entity practicing aspects of the present invention sets a minimum, maximum, or specified number of customers that must comprise the group. In other embodiments there may be no minimum, maximum, or specified number of customers for a group and this field may be omitted. It should be noted that the required number of customers field 1015 may store a range rather than a particular number. For example, a retailer may specify as a condition that a minimum of three and a maximum of four (3–4) customers may comprise a group that desires to earn a particular reward.

The current number of customers field 1020 stores an indication of a number of customers that currently are members of a group. Such a field may be particularly useful in embodiments where the retailer or other entity practicing aspects of the present invention specifies a minimum, maximum, and/or particular number of customers for a group. Such a field may also be used in other embodiments, to indicate the current number of customers that are currently registered as members of a group. For example, the number of customers comprising a particular group may fluctuate as additional members join and/or members are removed from a group. Members may be removed from a group by, for example, removing themselves voluntarily from the group or being disqualified from the group. A customer may be disqualified from a group by, for example, failing to meet one or more purchasing conditions. Further, a customer may be disqualified from a group by the retailer or other entity practicing aspects of the current invention and/or by one or more other members of the group.

In embodiments wherein a retailer or other entity practicing aspects of the present invention specifies a minimum number of customers required for a group, the group may not be allowed to begin earning the reward until and/or unless the current number of customers registered as members of the group is at least equal to the required number of customers. In other words, in accordance with one or more embodiments, a group may not be activated unless and/or until it comprises at least a minimum number of customers. In one or more embodiments, a first set of purchasing conditions may apply to a group when the current number of customers is less than the required number of customers for a group and a second set of purchasing conditions may apply to a group when the current number of customers is equal to or greater than the required number of customers.

The member identifier(s) field 1025 stores an indication of the member identifiers that identify members registered as part of a group. A member identifier may comprise, for example, a frequent shopper identifier of a customer. A member identifier may also comprise, for example, a name, address, and/or account identifier associated with a customer. A customer may be registered as a member of more than one group. Thus, the same member identifier may appear in the records of more than one group. In some embodiments each member of a group is assigned or otherwise associated with an identifier particular to that group. For example, a member identifier may be based on a group identifier such that at least a portion of the group identifier is incorporated into the member identifier. In such embodiments a particular customer that is a member of more than one group may be associated with more than one member identifier, each member identifier indicating the corresponding group of which the customer is a member.

The membership eligibility field 1030 stores an indication of the requirements for being a member of a particular group, if any. For example, record R-1090 has "N/A" (representing "not applicable") stored in the membership eligibility field 1030, indicating that there are no requirements for membership eligibility for group "G-99-0011". Eligibility requirements for membership in a particular group are conditions or characteristics of a customer that must be satisfied before the customer is permitted to register as part of the group. Eligibility requirements may be determined by, for example, (i) the retailer or other entity that is practicing aspects of the present invention, (ii) one or more customers of the group, or (iii) a combination thereof. Eligibility requirements may be determined based on, for example, characteristics of the reward to be earned and/or one or more conditions for earning the reward. For example, if a reward is uniforms for the little league of a particular town, a group eligibility requirement may be that the customer live in the vicinity of the town or be a parent of a child in the little league. In another example, if a condition of earning the reward is to spend at least $100 at the retailer per week, a group eligibility requirement may be that the customer not have a history of spending more than $100 per week at the retailer prior to joining the group. Such a requirement may be specified by a retailer, for example, who wishes to use the group reward program of the present invention to encourage customers who do not already spend a certain amount of money with the retailer to do so in the future by joining a group. In one or more embodiments, a retailer or other entity practicing aspects of the present invention may determine a customer's purchasing history, for example, based on the customer's frequent shopper identifier before allowing the customer to join a group.

The group status 1035 stores an indication of the status of a group, as it relates to earning a reward the group is registered for. The status of the group may, for example, simply indicate whether the group has begun its attempt to earn the reward or whether the group's progress towards earning the reward has begun to be tracked. For example, in accordance with one or more embodiments the tracking of a group's progress towards earning a reward is not necessarily begun at the time the group registers for the reward. For example, the retailer or other entity practicing aspects of the present invention may not begin to track the purchases of group members to determine whether the group is satisfying the purchasing conditions specified for the group until a minimum number of members has registered as being part of the group. In other embodiments, the retailer or other entity may not begin to track purchases of the group to determine whether the group is satisfying purchasing conditions until the current time is a predetermined time. For example, a specified beginning date may be a condition of earning the reward or the purchases of all newly registered groups may begin to be tracked only on a specified day of the week, for bookkeeping purposes.

If the purchases of a group are currently being tracked to determine whether the group is satisfying the purchasing condition(s) specified for the reward then the group status field 1035 may indicate that the group is "active". If the purchases of the group are not currently being tracked then the status of the group in the group status field 1035 may be "inactive". In other embodiments, a record for a group may not be opened in customized reward database 1000 until the purchases of the group have begun to be tracked.

The group status field 1035 may store additional information. For example, if a group's status is "inactive", the group status field 1035 may also store an indication of a reason for the "inactive" status. The group status field 1035 may also store an indication of a group's progress towards earning a reward. For example, assume a group must spend $1,000 in aggregate per week for six weeks in order to earn a reward and has satisfied the requirement for the first week and has spent a total of $887 by the middle of the second week. The group status field 1035 for the record of the group may indicate "week 1 successful, $887 spent in week 2 to date" or something to that effect. Alternatively, the group status field 1035 may store information that is a pointer to one or more records in another database (e.g., a transaction database), the analysis of which would allow the group's progress to be determined. The information in the group status field 1035 may be updated on a periodic or non-periodic basis.

The reward description field 1040 stores information describing the reward a group has registered for. The description may be a description that one or more members of the group submitted as part of a request for the reward. The description may also include information obtained by the retailer or other entity practicing aspects of the present invention based on the description submitted by one or more members of the group. For example, the group may have submitted a request for "four round-trip airplane tickets to Las Vegas, leaving on Sep. 1, 2003 and returning on Sep. 3, 2003; departing from and returning to an airport in the New York metro area". Based on this description of the reward included in a request for the reward the retailer or other entity may have selected a particular airline, time of departure, and/or airport and included these selections in the reward description field 1040.

The reward description field 1045 may be updated on a periodic or non-periodic basis. For example, if members join (or depart from) a group the description of the reward may be updated to reflect the change in the number of members. For example, the number of airplane tickets in the above example may be adjusted. Further, in one or more embodiments the reward description may be updated if the group exceeds the condition(s) specified for the reward. For example, a characteristic of the reward may be modified based on the group's success in satisfying the purchasing conditions. For example, if the group spends more than twice the amount specified in the purchasing condition(s), the description in the above example may be modified to read "business class airline tickets" from "coach class airline tickets".

The reward value field 1045 stores an indication of the value of the reward described in reward description field 1040. The value of the reward, in accordance with one or more embodiments, is a monetary amount, or a value based on one or more monetary amounts, that is utilized to determine one or more conditions (e.g., purchasing conditions) that a group of customers must satisfy in order to earn a reward. The value of the reward may, for example, (i) be submitted by one or more customers, or (ii) be determined by the retailer or other entity practicing aspects of the present invention. A retailer or other entity may determine a value of a reward based on, for example, the description of the reward received in the request for the reward and/or data associated with one or more customers comprising the group. The value of the reward may be determined based on, for example:

(i) an expected cost of providing the reward, as incurred by the retailer(s) or other entity funding the reward;
(ii) an expected cost of the purchases to be made by the group in satisfying the purchasing conditions associated with the reward, as incurred by the retailer(s) or other entity funding the reward;
(iii) overhead costs incurred by the retailer(s) or other entity in administering or participating in the group reward program of the present invention;
(iv) an expected or predicted worth of the reward to the group (e.g., based on the retail price the group would expect to pay for the reward if it were not earned in exchange for completing purchases at the retailer); and/or
(v) a benefit to be realized by the retailer(s) at which the purchases are to be completed as a result of registering the group for the reward.

For example, in one or more embodiments a value of a reward requested by a group may be calculated by subtracting a monetary value representing a benefit to be realized as a result of providing the reward to the group from a sum of costs to be incurred as a result of providing the reward to the group.

An expected cost of providing the reward to the group, as incurred by the retailer(s) or other entity funding the reward, may be identified in the description of a reward submitted by one or more customers. Alternatively, the expected cost of the reward may be determined based on information submitted in the description or otherwise provided. For example, in some embodiments a request for a reward may include a retail price, a wholesale price, or another indication of the amount of money that would have to be paid to an entity (e.g., a manufacturer, wholesaler, or retailer) in order to provide the reward to the group. The cost of the reward may thus be determined based on this indication of the amount of money that would have to be paid. Such a method of determining the cost of the reward may be utilized, for example, in embodiments where the retailer(s) or other entity funding the reward (i) purchases the reward for the group from another entity and subsequently provides the reward to the group, and/or (ii) provides a payment that is the retail price for the reward to either one or more customers of the group or to an entity that is to provide the reward to the group. Such a method of determining the value of the reward may also be utilized, for example, in embodiments where the reward is a product and/or service the retailer(s) normally provide(s) to customers. For example, in such embodiments the cost of the reward may be the price which a retailer that is funding the reward normally obtains the reward for (e.g., from another entity such as a manufacturer or wholesaler).

In one or more embodiments, the cost of providing the reward may be derived from the description of the reward received from the group, without a price or other express indication of cost being included in the description. For example, a group of customers may not know the price of the reward. In another example, the group may provide a description of the reward that is sufficiently broad to encompass several variations of the reward, wherein the cost of providing the reward may vary depending on the actual variation selected. For example, the group's description may allow the retailer to select a source from which the reward will actually be obtained (e.g., whether an airline ticket is to be purchased from a first airline or a second airline) and/or to determine additional characteristics of the reward.

An expected cost of the purchases to be made by the group in satisfying the purchasing conditions associated with the reward, as incurred by the retailer(s) or other entity funding the reward, may be based on, for example, how much it will cost the retailer or other entity to acquire the goods or provide the services that comprise the purchases. Determining the expected cost of the purchases may comprise determining what particular goods and/or services the group (or individual members of the group) are expected to purchase when satisfying the purchasing conditions. For example, the purchasing history of one or more members of the group may be retrieved (e.g., based on a frequent shopper identifier of the member) and an analysis performed. The analysis may be performed to determine (i) what particular goods and/or services the one or more members typically purchases, (ii) the particular goods and/or services the one or more members purchases at times that correlate to the purchasing conditions, and/or (iii) an average cost to the retailer or other entity of purchases typically made by the one or more customers (e.g., determined by averaging the cost of each good or service purchased by the one or more members within a predetermined time).

In one or more embodiments, the expected cost of purchases is determined on predicted purchases or a predicted cost of purchases made by one or more customers other than a member of the group for which an expected cost of purchases is being determined. For example, a retailer or other entity may calculate an average cost incurred by the retailer or other entity for a typical purchase made by a customer. Such an average cost may be calculated by aggregating purchases made by all customers (e.g., of a particular retailer or particular type of retailer) within a predetermined period of time. Alternatively, such an average cost of purchases may be calculated by aggregating purchases made by a subset of customers that share one or more common characteristics. For example, an average cost of purchases for particular demographic profiles of customers may be determined. Accordingly, in some embodiments, determining a cost of purchases for a group may comprise determining a demographic profile of at least one member of the group and determining an average cost of purchases associated with the profile. In one or more embodiments the demographic profile of each customer may be determined, the average cost of purchases for each demographic profile of each customer may be determined, and the determined average costs summed to determine an expected cost of purchases for the group. After reading the present specification, other methods of determining an expected cost of purchases would be understood by one of ordinary skill in the art.

Overhead costs incurred by the retailer(s) or other entity in administering or participating in the group reward program of the present invention may comprise, for example, (i) costs incurred in employing personnel in association with the program, (ii) costs incurred in purchasing computing devices and/or software necessary or helpful to administer the program, and/or (iii) fees paid to other entities in exchange for participation in the program. The last cost may be incurred, for example, in embodiments wherein a group reward program is administered by an entity to which retailers pay a fee in exchange for acquiring customers through the group reward program.

An expected or predicted worth of the reward to the group may comprise a value based on an actual or perceived monetary worth of the reward to the group. Such a perceived monetary worth may be determined from information provided by the group or from other sources. For example, in some embodiments, a group requesting a reward may indicate (in the description of the reward when submitting the reward or otherwise) a monetary amount that the group perceives it would have to pay in order to acquire the reward through means other than the group reward program. For example, the group may indicate a price it perceives it would have to pay in order to obtain the reward. Such a price may be, for example, a retail price for which one or more entities provides the reward. In other embodiments, such a price may also be a price the group perceives it would need to pay (or be willing to pay) in order to acquire the reward through other means. For example, the reward may comprise one or more tickets to a sold out concert or event that is by invitation only and thus not readily available for purchase.

In other embodiments, the expected or predicted worth of the reward to the group may be determined by the retailer or other entity practicing aspects of the present invention. The predicted worth may be determined based on information obtained from one or more members of the group or from another source. For example, assuming the reward is entrance to a sold out or "by invitation only" event, the price a typical fan of the event would be willing to pay for the reward may be determined by the retailer (e.g., based on survey questions answered by fans or prices fans of the event or similar events have paid for entrance to the events). It should be noted that if the reward is one that the group would not be able to easily obtain by means other than the group reward program (e.g., tickets to a sold out or "by invitation only" event), a premium may be added to a retail or market price when determining the value of the reward.

In one example, a group may specify a cost of a reward in their request for the reward. For example, a group may submit a request for twelve (12) little league uniforms by specifying that they are in need of $200 for twelve (12) little league uniforms. The cost of the reward may thus be determined directly from the description of the reward as being $200. Such a method of determining a cost of a reward would not require significant management or research capabilities of the retailer or other entity practicing aspects of the present invention.

In another example, rather than actively attempting to research the cost of a reward, a retailer or other entity may simply make the description of a reward desired by a group available to entities potentially capable or willing to provide the reward. For example, such descriptions may be posted on a Web page accessible by retailers, manufacturers, wholesalers, and/or other entities capable of providing various goods and or services to customers. If an entity viewing such descriptions determines that it is willing and/or able to provide a particular reward it may communicate such a capability and/or willingness to the retailer or other entity practicing aspects of the present invention. The entity may further indicate the amount of money it will charge the retailer or other entity for providing the reward. Thus, the retailer or other entity may determine the cost of a particular reward based on one or more such communications of willingness from one or more entities to provide the reward.

A benefit to be realized by the retailer(s) at which the purchases are to be completed as a result of registering the group for the reward comprises a tangible or intangible benefit to be realized by the retailer. Such a benefit may be determined before and/or after condition(s) for purchasing a reward are determined. For example, in accordance with one or more embodiments a benefit to be realized may be determined and subtracted from costs expected to be incurred as a result of providing the reward to the group, thereby determining a value of the reward. One or more conditions for earning the reward may then be determined based on the value. In other embodiments one or more condition(s) may be determined (e.g., based on an expected cost of providing the reward) first and a benefit to be realized as a result of providing the reward in accordance with the condition(s) may then be determined. A determination may thus be made as to whether the benefit of the determined conditions is at least equal to the determined cost. If not, one or more alternate condition(s) may be determined. Of course altering one or more of the condition(s) may result in a change in the cost expected to be incurred. Such a change in the cost may be accounted for in the subsequent determination of whether the benefit to be realized as a result of the altered condition(s) is at least equal to a cost to be incurred in providing the reward. Such an iterative process may be continued until condition(s) are determined wherein the benefit of providing the reward in accordance with the condition(s) is at least equal to the cost to be incurred in providing the reward.

A tangible benefit may be an amount of revenue or profit to be realized by the retailer. Such an amount of revenue or profit may be an amount determined based on (i) the purchases expected to be made by the group in satisfying the purchasing conditions, (ii) purchases expected to be made by one or more members of the group outside of the purchasing conditions, and (iii) a combination thereof. A retailer or other entity may determine an expected amount of profit or revenue in manners similar to those described above with respect to determining an expected cost of providing the reward. For example, a retailer may associate a monetary value with acquiring a new customer and/or habituating a current customer into a regular or frequent shopping pattern. Such a monetary value may be based on an amount of profit or revenue the retailer expects to realize from the customer over the course of the retailer's relationship with the customer.

An intangible benefit that a retailer may expect to realize may comprise an increase in the goodwill of the retailer's business or a favorable impression of the retailer to the retailer's customers or investors (e.g., a public relations value). A retailer may associate a monetary amount with such an intangible benefit. For example, a retailer may associate a predetermined monetary amount with each instance of providing a reward or each instance of registering a group for a reward. The retailer may assign the same monetary amount to each such instance or may vary the monetary amount based on the nature of the reward. For example, a reward that is a contribution to a charitable organization or associated with a community event or organization (e.g., a church or little league team) may be associated with a higher monetary amount than a reward that is a good or service to be provided for the personal use or enjoyment of one or more group members (e.g., a discount to a store or airline tickets).

It should be noted that although the present invention has been described herein as being used to benefit retailer(s) (by acquiring new customers for the retailer(s) and/or accustoming current customers into a shopping pattern with the retailer(s)), it may be equally applicable and beneficial to manufacturers. For example, a manufacturer may be willing to participate in a group reward program of the present invention in order to provide rewards to groups of customers in exchange for the customers' agreement to complete purchases of the manufacturer's products in accordance with one or more conditions.

It should be noted that value of the reward may or may not be revealed to one or more members of the group. For example, in one or more embodiments the retailer or other entity practicing aspects of the present invention may determine a value of a reward for purposes of determining conditions the group would have to satisfy in order to earn the reward without conveying the determined value to any member of the group or other customer. Methods of valuing a reward requested by one or more customers will be described in more detail with respect to step 1115 of FIG. 11A, below.

Referring again to FIG. 10, the purchasing condition(s) field 1050 stores an indication of one or more purchasing conditions that must be satisfied by a group in order to earn the reward the group is registered for. A purchasing condition is a condition defining one or more purchases that one or more group members must satisfy in order to earn the reward. For example, a purchasing condition may define (i) a time at which one or more purchases must be made (e.g., a specified date or a time measured from a previous purchase), (ii) one or more products and/or services to be included in a purchase, (iii) a value of one or more purchases (e.g., a minimum purchase total of a purchase), (iv) a location at which a purchase is to be completed, and/or (v) a method by which a purchase is to be completed (e.g., online versus a brick-and-mortar store, or via a particular method of payment such as a specified credit card).

As described with reference to FIG. 10 and elsewhere in the present application, one or more condition(s) other than a purchasing condition may need to be satisfied in order for a group to earn a reward. A condition other than a purchasing condition is one that does not define one or more purchase(s) but must still be satisfied in order for the group to obtain the reward. Examples of such a reward include (i) a period of time during which the group must satisfy any purchasing condition(s) (e.g., as indicated by the target date of field 1055), (ii) a minimum and/or maximum number of customers that must comprise the group (as indicated by the required number of customers field 1015), and/or (iii) a requirement that one or more of the members perform a task and/or agree to a commitment. Examples of the last type of condition include a requirement that one or more members of a group open a financial account (e.g., a credit card account) with a specified financial institution, answer survey questions, and/or help recruit or market to potential employees for the retailer. Methods of determining one or more conditions (whether purchasing conditions or otherwise) will be discussed in more detail with respect to FIGS. 11A and 11B, FIG. 12, and FIG. 13.

The target time field 1055 stores an indication of the time by which the group is to satisfy the one or more conditions indicated in purchasing condition(s) field 1050 and thus earn the reward. The information stored in target time field 1055 may be, for example, a specified date (e.g., Mar. 3, 2003). Alternatively, the information stored in the target time field 1055 may be a description of an event the occurrence of which will determine when the group has to satisfy the one or more conditions and thus earn the reward. For example, the information stored in target time field 1055 may indicate that the end time for satisfying the one or more conditions of field 1050 is a specified amount of time after the occurrence of a specified event (e.g., eight weeks from the activation of the group, whenever that occurs). In another example, the information stored in target time field 1055 may indicate that the end time for satisfying the one or more conditions of field 1050 is whenever a specified event occurs (e.g., when the group has earned a specified number of units of a reward by satisfying the condition(s) indicated in field 1050 on an ongoing basis).

In one or more embodiments no target time may be associated with a group. For example, the group may keep earning a reward, portions of a reward, or units of a reward on an ongoing basis as long as the group keeps satisfying the condition(s) indicated in field 1050. Further, in one or more embodiments the target date field 1055 may store an indication of more than one time (e.g., may store two indications of time, to be used in the alternative). It should be noted that the time, if any, indicated in the target time field 1055 may be a time that is specified by one or more customers of a group or a time specified by a retailer or other entity and agreed to by the group.

Figure 11A:
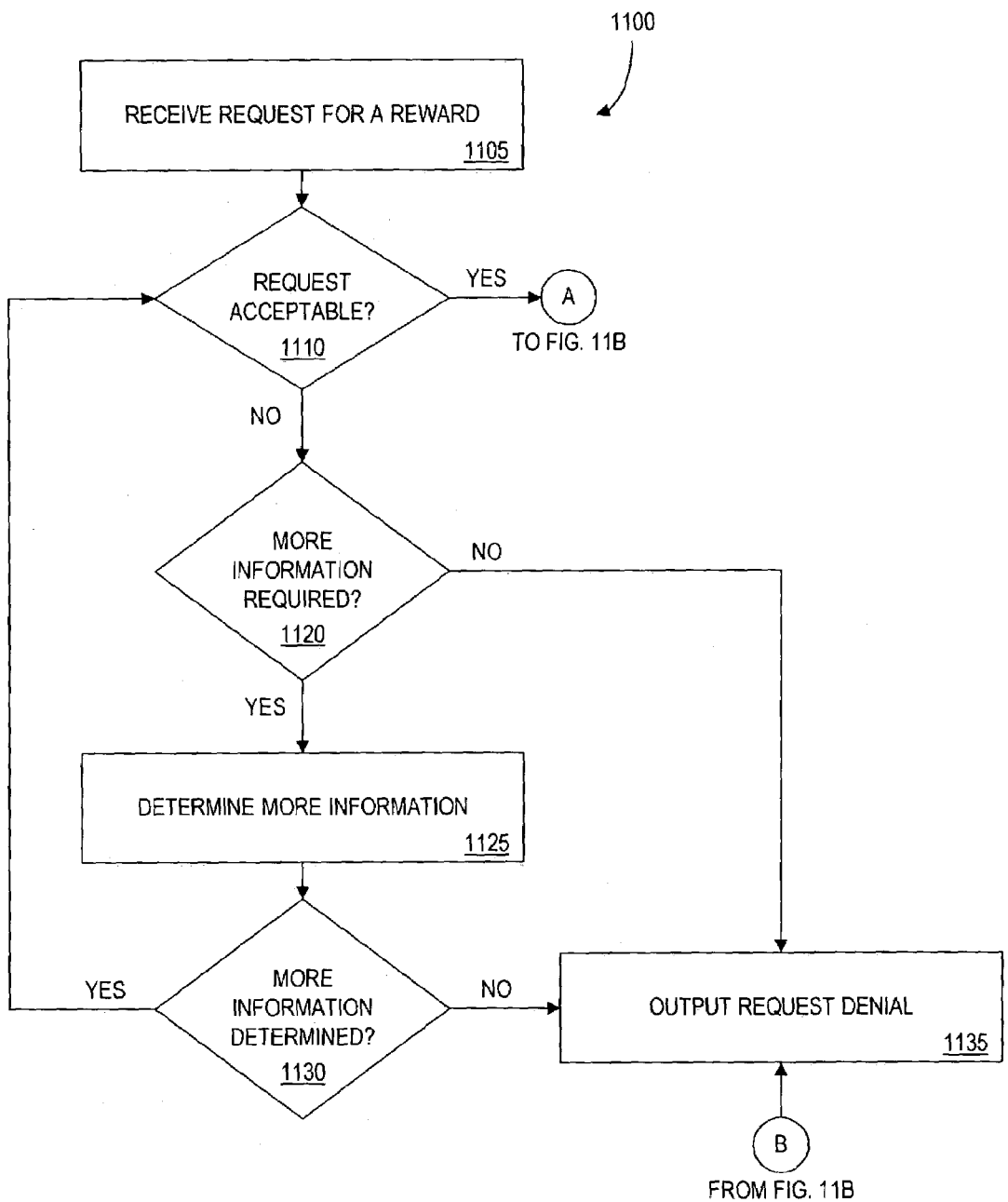
FIGS. 11A and 11B are a flow chart illustrating a process in accordance with one or more embodiments of the present invention.
Figure 11B:
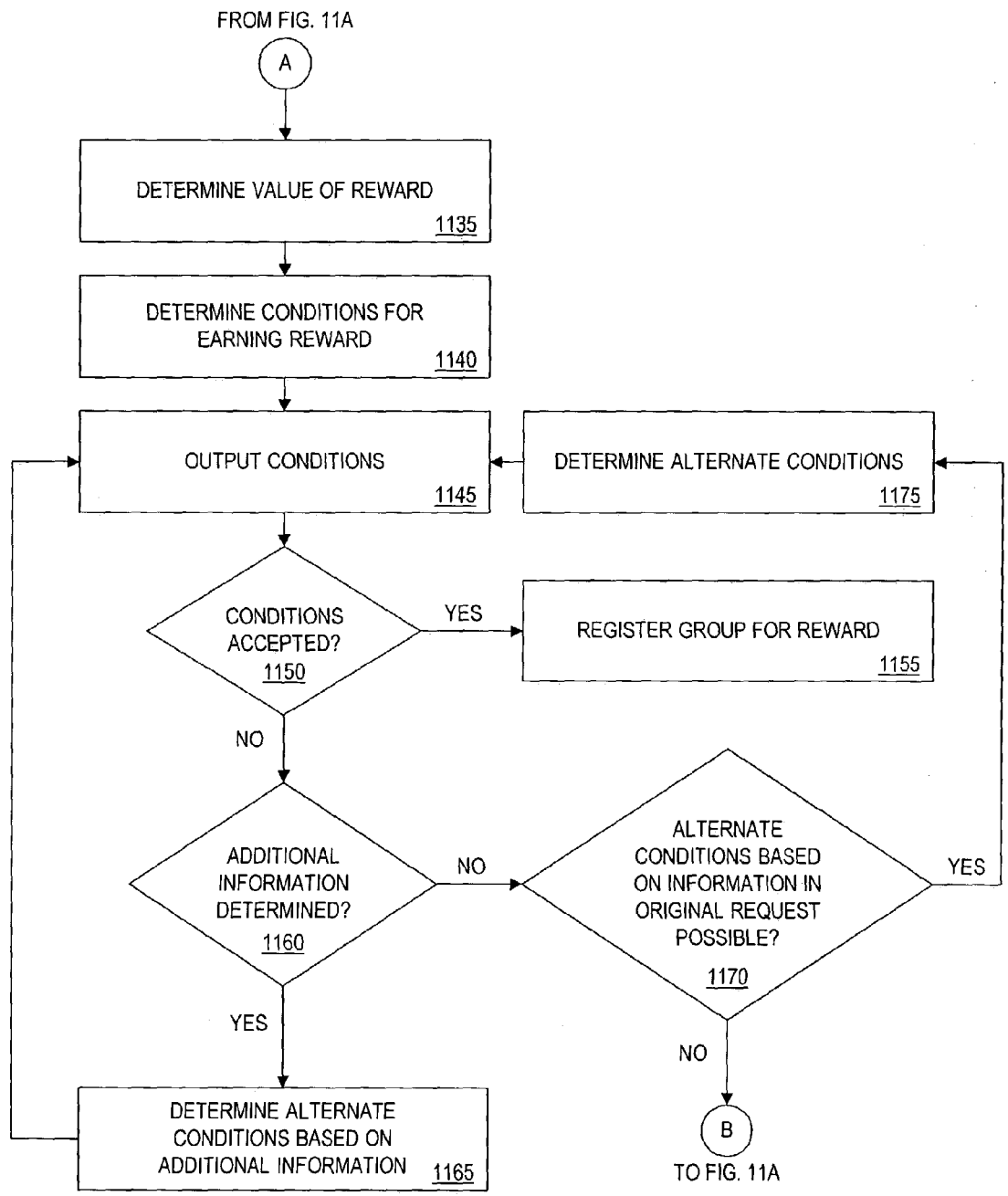

Referring now to FIGS. 11A and 11B, a process 1100 illustrates an exemplary method of facilitating a group's registration for a reward in accordance with one or more embodiments of the present invention. Steps of the process 1100 may be performed, for example, by (i) one or more seller device 112, (ii) one or more seller device 170, (iii) controller 155, (iv) another computing device, (v) a human being, or (vi) a combination thereof. It should be understood that any of the steps of process 1100 may be performed in an order different from that presented in FIGS. 11A and 11B.

A request for a reward is received at step 1105. The request may include a description of the reward. The request may be received from, for example, a computing device such as a POS terminal, a personal computer, a kiosk, or another type of customer device 116 or customer device 180. Alternatively, a request may be received via postal mail (e.g., by means of a printed application that serves as a request for a reward). A detailed description of what information may be included in a request for a reward is included above.

A determination of whether the request is acceptable is performed at step 1110. Determining whether the request is acceptable may comprise, for example, determining whether (i) the reward is obtainable; (ii) the description of the reward is sufficient to allow an understanding of what the reward is; and/or (iii) the reward is not illegal, immoral, prohibitively expensive or otherwise categorized as a type of reward the retailer or other entity practicing aspects of the present invention is not willing to provide. A prohibitively expensive reward may be, for example, a reward the cost of which is so high that any conditions set for earning the reward (e.g., such that the retailer or other entity still realizes a profit from providing the reward or at least breaks even) are impractical or unrealistic for a group to satisfy.

If the request is not determined to be acceptable in step 1110, the process 1100 continues to step 1120, where it is determined whether more information is necessary in order to determine whether the request is acceptable. For example, if a determination of acceptability of the request was not possible in step 1110 because the description of the reward was too broad or too vague, more information about the reward may be solicited from the one or more customers submitting the request.

If more information is necessary in order to determine whether the request is acceptable, the process 1100 continues to step 1125, where more information is determined. It should be noted that step 1125 may comprise determining information from a source other than the one or more customers that submitted the request. For example, it may be necessary in one or more embodiments to determine a retail or wholesale price for the reward in order to determine whether the reward is prohibitively expensive. In such an example, the step 1125 of determining more information may comprise contacting an entity that offers the reward for sale and determining how much it would cost to obtain the reward from the entity.

In step 1130 it is determined whether the necessary additional information has been determined (e.g., within a predetermined amount of time). If it has been, the process 1110 returns to step 1110, where a determination is again made as to whether the request is acceptable (using the additional information determined).

If the additional information is not determined in step 1130, a denial of the request is output in step 1130. A denial of a request may comprise, for example, outputting an audio or textual message to the one or more customers who submitted the request and/or an operator of a seller device. For example, a message indicating that the request for the reward is being denied may be communicated to a computing device for display on a screen. In another example, a message indicating that the request for the reward is being denied may be printed. The printed message may be provided to a customer via a computing device (e.g., output at a printer attached to a POS terminal or kiosk) or by being mailed to a customer via postal or electronic mail.

A denial of a request may or may not include a reason explaining why the request is being denied. A denial also may or may not include one or more suggestions for modifying the request (e.g., modifying the description of the reward) in order to make the request more likely to be accepted.

If, in step 1120 it is determined that more information is not necessary then the process 1100 continues to step 1135, where a denial of the request is output. A determination that more information is not necessary may be made by determining that, even if additional information were determined, the request would still not be acceptable. It may be determined that more information is not necessary, for example, if the reward clearly falls within a category of rewards that the retailer is not willing to provide (e.g., the reward is illegal) or if the request includes a target date that has already passed.

Figure 12:
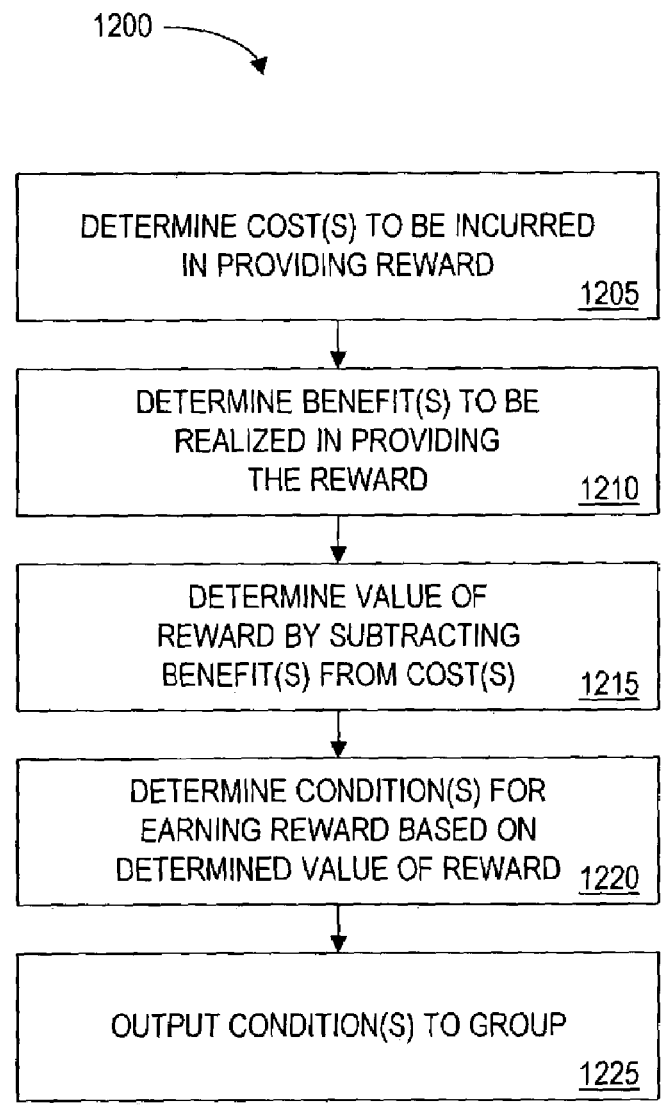
FIG. 12 is a flow chart illustrating a process for determining one or more conditions for earning a reward, in accordance with one or more embodiments of the present invention.

Once it is determined in step 1110 that a request is acceptable the process 1100 continues to step 1115. Step 1115 comprises determining a value of the requested reward. As described above, in one or more embodiments the requested reward may have already been at least partially valued for purposes of determining whether the request is acceptable (in step 1110). Various methods of valuing a reward are described above, with reference to reward value field 1045 (FIG. 10). One particular and exemplary method for valuing a reward is illustrated in FIG. 12.

Figure 13:
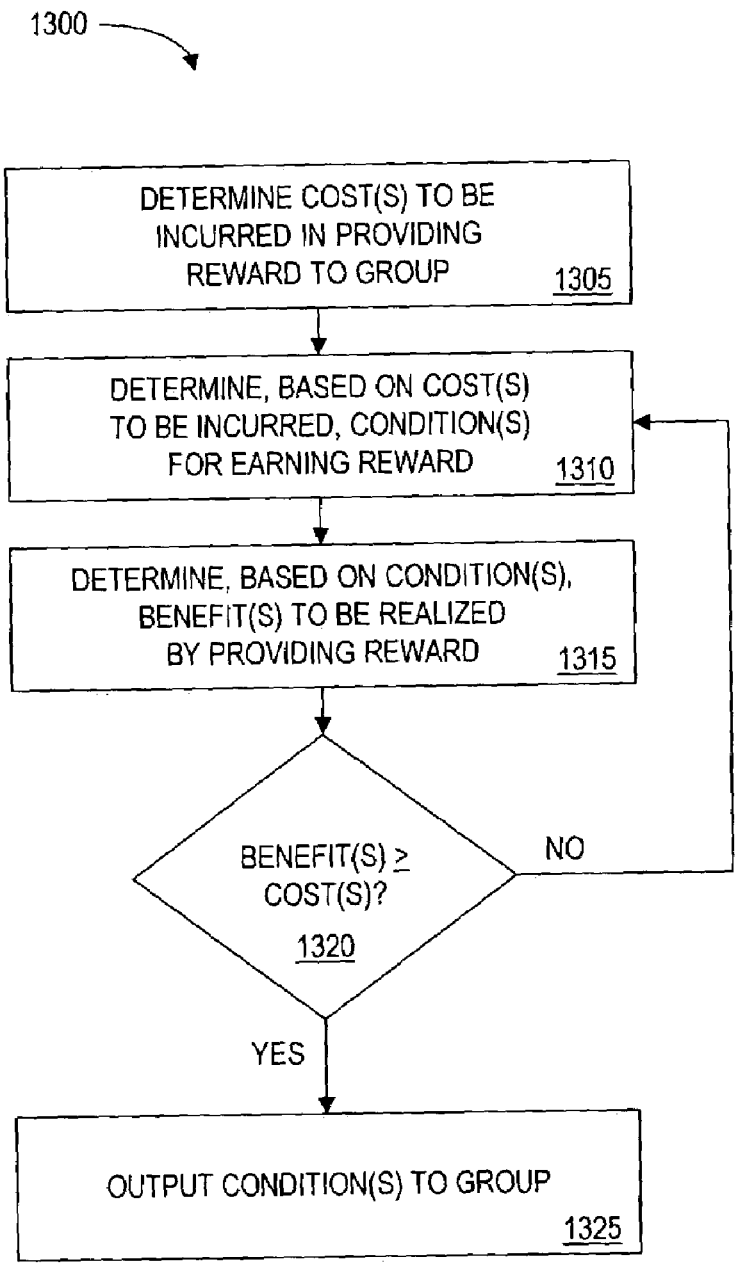
FIG. 13 is a flow chart illustrating another process for determining one or more conditions for earning a reward, in accordance with one or more embodiments of the present invention.

One or more conditions for earning a reward are determined in step 1140. In one or more embodiments the condition(s) may be determined based on the value of the reward determined in step 1115. One such exemplary method is illustrated in FIG. 12. In other embodiments the one or more conditions for earning a reward may be determined before or in conjunction with determining a value of the reward. An exemplary process of such a method is illustrated in FIG. 13.

In one or more embodiments, one or more conditions may be specified in the request for the reward. For example, a target date for the reward and/or a number of customers comprising the group may be specified in the request for the reward. Accordingly, the step of determining one or more conditions may comprise determining a condition specified in the request. In accordance with some embodiments, the determination of additional condition(s) (in addition to those specified in the request) may be determined based at least partially on the specified condition(s). For example, a frequency of purchases and/or a number of purchases to be completed may be determined based on the number of customers comprising the group, the target date by which the group desires to earn the reward, and the value of the reward.

In step 1145 the determined condition(s) are output. The condition(s) may be output to, for example, (i) the one or more customers who submitted the request, (ii) the one or more customer who are to comprise the group, (iii) one or more other customers, and/or (iv) an operator of a seller device 116 or a seller device 170 (e.g., prompting the operator to verbally convey the condition(s) to one or more customers). Outputting the condition(s) may comprise outputting an audio, video, or textual message conveying the condition(s). For example, the condition(s) may be displayed via a screen of a computing device (e.g., a screen of a personal computer, a screen of a kiosk, a screen of a POS terminal). An indication of the condition(s) may be printed and provided to one or more customers via, for example, a receipt or other document printed at a point-of-sale, or a document transmitted to one or more customers via postal mail. Alternatively, an electronic message indicating the condition(s) may be transmitted to one or more customers. The condition(s) may be output, for example, for acceptance to the one or more customers who submitted the request for the reward and/or to the one or more customers who are to comprise the group.

As noted, the one or more customers to whom the condition(s) are transmitted may or may not be the one or more customers who submitted the request for the reward. For example, in one or more embodiments the availability of joining a group in order to earn a specified reward in accordance with the condition(s) may be conveyed to a customer of a retailer who was not involved in submitting the request. In a particular example, it is envisioned that the availability of one or more groups to join may be displayed to a customer via a (i) Web site (e.g., of an online retailer); (ii) a point-of-sale of a brick-and-mortar retailer (e.g., by being printed on or in association with a point-of-sale register receipt or coupon), (iii) a display at a brick-and-mortar retailer, (iv) a direct-mail postal mailing or electronic mailing, and/or (v) via public advertising (e.g., a magazine, radio, television, or billboard advertisement).

The availability of one or more groups to join may be conveyed, for example, to all customers of one or more retailers or a subset of customers. A subset of customers may comprise, for example, customers who (i) fit a particular demographic profile, (ii) reside in a particular location, and/or (iii) have expressed a willingness to receive indications of available groups to join. A description of the reward, a current status of the group, an identifier associated with the reward, and/or an identifier identifying the group may be output along with the indication of the availability of the group and the condition(s).

A determination of whether the output one or more conditions have been accepted is made in step 1150. Such a determination may comprise, for example, a determination of whether a signal indicating acceptance has been received. Such a signal may be received, for example, from a remote computing device such as a personal or laptop computer being operated by a customer. Alternatively, such a signal may be received from a point-of-sale terminal or other computing device being operated by an operator who indicates acceptance of one or more customers based on a verbal and/or written agreement received from a customer. For example, a customer may tell a cashier operating a point-of-sale terminal or a terminal at a customer service desk of a retailer that the customer is accepting the output condition(s). It should be noted that, in accordance with some embodiments, an acceptance from each customer comprising the group may be necessary for the condition(s) to be determined to have been accepted. In other embodiments an acceptance from a subset of the customers comprising the group may be sufficient for the condition(s) to be determined to have been accepted. For example, in one or more embodiments one customer is determined to be the leader or representative of the group. In such embodiment(s), an acceptance of the condition(s) from this customer may be sufficient for the condition(s) to be determined to have been accepted.

As noted earlier, in some embodiments a minimum number of customers is specified as necessary for activating a group. In such embodiments, determining whether the condition(s) have been accepted in step 1150 may further comprise determining whether the minimum number of customers have accepted the condition(s).

If it is determined, in step 1150, that the condition(s) have been accepted the process 1100 continues to step 1155. In step 1155 the group is registered for the reward. Registering the group for the reward may comprise, for example, opening a record in a database such as exemplary customized reward database 1000 (FIG. 10). Registering the group may further comprise determining a group identifier for the group and/or determining the member identifier(s) of each of the members comprising the group.

If it is determined instead in step 1150 that the condition(s) have not been accepted, the process 1100 continues to step 1160. A determination that the condition(s) have not been accepted may be based on, for example, a received rejection of the conditions or a determination that no response, to the output condition(s) has been received within a predetermined amount of time.

In step 1160 it is determined whether additional information has been received. For example, the a rejection of the condition(s) indicated by one or more customers may include additional information regarding a change in one or more condition(s) and/or the reward that would make the condition(s) more likely to be accepted by the group. In some embodiments, additional information may be determined from a source other than a customer in response to a rejection of the condition(s) from one or more customers. For example, another entity offering the reward for sale at a price that is lower than previously determined may be identified. Identifying a lower price for the reward may result in a lower value of the reward being determined and thus, potentially, different condition(s) for earning the reward being determined.

If additional information has been determined in step 1160 then alternate condition(s) based on the additional information are determined in step 1165. The process 1100 then returns to step 1145 and the alternate conditions are output in a manner similar to how the previous conditions were output.

If, on the other hand, additional information has not been determined in step 1160, the process 1100 continues to step 1170 where it is determined whether alternate conditions based on the information in the original request are possible. For example, assume the original conditions specified a frequency of one purchase every two weeks, where the minimum value of the purchase is $150. If one or more customers rejected the conditions it may be possible to determine alternate conditions where the purchases are required to be made with a higher frequency but the value of each purchase is lower. For example, alternate conditions may be determined that require a purchase once every week, where the minimum value of each purchase is $100. Such alternate conditions may be determined, for example, based on the same value of the reward as the first set of conditions was. A customer who shops at the retailer at which the purchases are to be made on a weekly basis but does not typically spend over $125 may feel more comfortable accepting the second set of condition than the first.

If, in step 1170, it is determined that alternate condition(s) based on the information in the original request are not possible, the process 1100 continues to step 1135, where a denial of the request for the reward is output. The denial of the request may be output in a manner similar to that described above.

If, in step 1170, it is determined that alternate condition(s) based on the information in the original request are possible, alternate condition(s) are determined in step 1175. The process 1100 returns to step 1145, where the alternate condition(s) are output. The alternate condition(s) may be output in a manner similar to that described above.

It should be noted that, although the process 1100 has been described herein as determining one set of condition(s) at a time and outputting them, other variations are possible. For example, in one or more embodiments a plurality of sets of conditions may be determined in step 1140, step 1165, and/or step 1175. In such embodiments more than one set of determined condition(s) may be output to the one or more customers in step 1145. For example, each of the sets of determined conditions may be output or a subset of the determined sets of conditions may be output. A subset of the set of conditions may comprise, for example, the three sets that are expected to be the most favorable to the customer or the three sets that result in the most benefit being realized by the retailer. In embodiments where more than one set of condition(s) is output to the one or more customers in step 1145, the step 1150 of determining whether the conditions were accepted may further comprise determining which set of conditions was accepted.

It should further be noted that, in one or more embodiments, a different set of conditions may be determined for one customer of a group than for another customer of the group. In such embodiments, the step 1145 of outputting the conditions may comprise outputting each set of determined conditions to a single customer (e.g., to the group representative or customer who submitted the request). Alternatively, each customer that is to be a member of the group may be presented with the particular set of conditions that correspond to him or her. In such embodiments the step 1145 of outputting the conditions may comprise outputting each respective set of conditions to the customer to whom the set corresponds. Further, in such embodiments, the step 1150 of determining whether the condition(s) were accepted may comprise determining whether each customer to whom the conditions were output accepted the conditions.

Referring now to FIG. 12, a process 1200 is illustrated. The process 1200 comprises an exemplary process for determining purchasing conditions that have to be satisfied in order for a group to earn a reward. The process 1200 illustrates a method wherein the purchasing conditions are determined based on a value of the reward. The process 1200 further illustrates one method for determining the value of the reward. The process 1200 may be performed, for example, by a seller device 112, a seller device 170, the controller 155, another computing device, a human operator, or a combination thereof. The process 1200 may be performed at a time right after a request for a reward is received or another time. For example, the process 1200 may be initiated when a request for a reward is received. Alternatively, the process 1200 may be performed on a periodic or non-periodic basis for any requests for rewards that have been received since the last time the process 1200 was performed.

In step 1205 the costs to be incurred in providing the reward are determined. Such costs may comprise, for example, a price the retailer or entity practicing aspects of the present invention would have to pay to another business in order to provide the reward to the group, the expected cost of the purchases expected to be made by the group, and/or overhead costs of administering or participating in the group reward program of the present invention. Further details of what such costs may comprise and/or how they may be determined are discussed above with respect to the purchasing condition(s) field 1050 of FIG. 10. For purposes of step 1205, the costs is determined as a monetary amount.

In step 1210, the benefit(s) to be realized by the retailer in providing the reward to the group are determined. Details of what a benefit realized by a retailer may comprise and/or how it may be determined are discussed above with respect to the purchasing condition(s) field 1050 of FIG. 10. For purposes of step 1210, the benefit to be realized is determined as a monetary amount.

In step 1215, the value of the requested reward is determined. In accordance with the one or more embodiments exemplified in step 1215, the value of the reward may be determined by subtracting the benefit determined in step 1210 from the cost(s) determined in step 1205. Alternatively, in one or more embodiments, the cost(s) determined in step 1210 may be subtracted from the benefit. In either method, the resultant value may be a positive or negative value.

In step 1220, one or more condition(s) for earning the reward are determined based on the value of the reward determined in step 1215. For example, certain purchasing condition(s) may be determined based on rules pertaining to the value of the reward. An example of how purchasing conditions may be determined based on such rules follows.

EXAMPLE 1

(i) Rule 1: Determining a minimum aggregate purchase total for the group.
    For each $5 of the value of the reward, add $50 to the minimum amount the group's purchases must total over the course of earning the reward
(ii) Rule 2: Determining a minimum number of customers to be included in the group.
    For each $25 value of the reward over $50, add an additional customer to the minimum number of customers above 2

(iii) Rule 3: Determining a number of purchases to be made by the group.
    For each $25 value of the reward, add 1 week of purchases over 3 weeks (1 purchase to be made per week)

Assume the value of the reward was determined to be $200 in step 1215.

Applying the above rules to the value of $200, the following purchasing conditions are determined:

(i) Applying Rule 1: group must spend a total of $2,000 to earn the reward:

($200)/($5)=40

(40)($50)=$2,000

(ii) Applying Rule 2: the group must include at least eight customers:

$200−$50 =$150

($150)/($25)=6

6+2=8

(iii) Applying Rule 3: the group must complete purchases over a course of eleven weeks:

($200)/($25)=8

8+3=11

Assume, for purposes of this example, that the total amount that must be spent by the group (as determined in accordance with Rule 1) is divided equally among the number of customers to be included in the group (as determined in accordance with Rule 2). Further assume that the total amount that must be spent by each customer is divided equally among the number of weeks the group must shop. Based on these assumptions the following set of purchasing conditions may be determined and output to the group:

The group must include 8 members and each member must spend a minimum of $23 (rounded up to the nearest dollar) per week for 11 weeks at the specified retailer(s).

Of course, a retailer and/or other entity practicing aspects of the present invention may utilize different or additional rules to determine purchasing or other conditions. For example, a retailer may specify a method of payment to be used by one or more members of a group to complete one or more purchases as a condition. For example, the retailer may be in a partnership agreement with a particular credit card account issuer and wish to encourage the use of that issuer's cards as payment at its establishment. In such a case the retailer may specify as a condition to earning a reward that one or more members of the group complete purchases using the issuer's card. If the one or more members does not have an established account with the issuer at the time of joining the group, the retailer may further specify that the member establish such an account as a condition to earning the reward.

In another example of a condition, a retailer may specify that one or more purchases by one or more members of the group be completed online rather than at the retailer's brick-and-mortar store (or vice versa). A retailer may specify such a condition for one or more members who the retailer determines have not previously completed an online purchase from the retailer. A retailer or other entity may make such a determination, for example, based on a customer identifier of the one or more members (e.g., by checking the purchasing history of the one or more members as stored in a database in association with the customer identifier) and/or based on an answer the one or more members provided in response to a survey question.

A retailer or other entity practicing aspects of the present invention may set one or more condition(s) based on data associated with a particular member. For example, a retailer may specify that the minimum purchase total per transaction be set based on past purchase totals associated with the customer. In some embodiments, for example, a retailer or other entity may desire to utilize the group reward system of the present invention to encourage a customer to increase their average purchase total (e.g., in the hopes that the customer will become accustomed to spending more with the retailer and continue to do so even after the customer is no longer participating in a group). The following rule exemplifies one method of adjusting a purchasing condition of a particular customer based on their purchasing history:

EXAMPLE 2

In addition to the rules of Example 1, assume the following rule is utilized to determine the minimum purchase total for each customer comprising the group:
Rule 4: Set the minimum purchase total for each required transaction to be at least 110% of the customer's average purchase total of prior purchases.
Assume that one of the customers that is to be a member of the group for which purchasing conditions were determined in the prior example is associated with an average purchase total of $40. Recall that in the above example the minimum purchase total for each transaction was determined to be $23.
Applying Rule 4, however, to determine the minimum purchase total for this particular member of the group results in a minimum purchase total of $44:

($40)(110%)=$44.

Accordingly, the purchasing conditions output to the group in the above example may specify that this particular customer has to spend at least $44 every week for 11 weeks. A similar calculation may be performed for each customer that is to be a member of the group.

Thus, in one or more embodiments, a specific minimum purchase total for each purchase may be set for each individual customer that is to be a member of the group. Example 2 assumes that each customer that is to be a member of the group is known and the purchasing history of each customer may be determined. Such information may not be readily available to a retailer or other entity practicing aspects of the present invention in other embodiments.

Other examples of how a retailer or other entity may modify or set a purchasing condition based on the purchasing history of a particular customer would be obvious to one of ordinary skill in the art after reading the present specification. For example, the frequency with which a particular customer must complete purchases with the retailer may be adjusted. For example, the purchasing frequency in the above examples is one purchase per week. However, if a customer already shops at the retailer once per week, the required frequency of purchases for that particular customer may be set such that the customer is required to complete a purchase more frequently than once per week (e.g., once every 4 days or twice per week). Such a condition may be set in order to accustom the customer to shop at the retailer on a more frequent basis, with the goal that the customer will continue the more frequent shopping pattern even after the customer is no longer a member of the group. It should be noted that a benefit to be realized by the retailer as a result of providing the reward to the group may be determined based at least partially on a benefit (e.g., increased revenue or profit) that the retailer expects to realize as a result of accustoming the customer into a more frequent shopping pattern and/or an increased average purchase total.

Once the condition(s) for earning the reward are determined in step 1220, the process 1200 continues to step 1225, where the determined condition(s) are output. The condition(s) may be output in a manner similar to that described with respect to step 1145 (FIG. 11B).

Referring now to FIG. 13, a process 1300 is illustrated. The process 1300 comprises another exemplary method for determining condition(s) for earning a reward. The process 1300 illustrates a method wherein the purchasing conditions are determined such that the benefits to be realized as a result of providing the reward to the group are at least equal to the costs to be incurred as a result of providing the reward to the group. The process 1300 may be performed, for example, by a seller device 112, a seller device 170, the controller 155, another computing device, a human operator, or a combination thereof. The process 1300 may be performed at a time right after a request for a reward is received or another time. For example, the process 1300 may be initiated when a request for a reward is received. Alternatively, the process 1300 may be performed on a periodic or non-periodic basis for any requests for rewards that have been received since the last time the process 1300 was performed. The process 1300 is initiated after a reward has been identified (e.g., after a request for a reward has been received).

The cost(s) to be incurred as a result of providing the reward are determined in step 1305. Such costs may be determined by the methods described above. Once the costs are determined, the process 1300 continues to step 1310, where an initial set of conditions for earning the reward are determined based on the cost(s). A set of conditions may be determined based on cost(s) in a manner similar to that described with respect to Example 1 and Example 2, above. That is, a monetary value that is the cost(s) to be incurred may be utilized in conjunction with one or more rules to determine one or more conditions.

The benefits to be realized by a retailer or other entity by providing the reward in accordance with the determined conditions are determined in step 1315. For example, an expected amount of profit or revenue that a retailer or other entity expects to realize as a result of the group completing purchases in accordance with the conditions may be determined. Various methods of determining such expected profit or revenue are described above. Another example of a benefit to be realized is a payment that the retailer may expect to obtain as a result of one or more of the conditions. For example, as described above, a condition may comprise requiring one or more of the group members to open an account with a credit card issuer. In one or more embodiments, the retailer or other entity practicing aspects of the present invention may obtain a bounty fee from such a credit card issuer or another entity with which the one or more members is required to establish a relationship as a condition for earning a reward. Another example of a benefit that may be determined in step 1315 is a monetary amount the retailer or other entity associates with habituating one or more members of the group to a regular shopping pattern with the retailer. Such a monetary amount may vary based on the length of time during which the one or more members has to complete purchases in order to earn a reward. For example, the longer a period of time a customer is required to complete purchases with a retailer over, the more likely it is that the customer will become accustomed to shopping at the retailer on a regular basis and the more such a condition may be worth to a retailer. However the one or more benefits to be realized by the retailer are determined, they are reduced to a monetary amount in step 1315.

In step 1320 the monetary amount that is the benefits to be realized, as determined in step 1315, is compared to a monetary amount that is the costs to be incurred, as determined in step 1305. If it is determined that the monetary amount that is the benefits is at least equal to the monetary amount that is the costs, the process continues to step 1325. If, on the other hand, it is determined in step 1320 that the monetary amount that is the benefits is not at least equal to the monetary amount that is the costs, the process 1300 returns to step 1310, where an alternate set of conditions is determined. It should be noted that the purpose of step 1320 is to ensure that the retailer or other entity funding the reward for the group does not incur a monetary loss as a result of providing the reward to the group. Step 1320 may, in one or more embodiments, be modified to ensure that the retailer or other entity funding the reward realizes at least a predetermined amount of profit as a result of providing the reward to the group. For example, the query in step 1320 may comprise a query as to whether the monetary amount that is the benefits exceeds the monetary amount that is the costs by at least a predetermined amount.

In step 1325 the conditions determined to be acceptable in step 1320 are output to one or more customers (e.g., customers of the group). Similar to the process 1100 described with respect to FIGS. 11A AND 11B, the process 1300 may continue by determining whether the one or more customers accepts the output rewards and, if not, negotiating with the group until a set of rewards that is both acceptable to the retailer or other entity practicing the invention and the group is determined.

Figure 14:
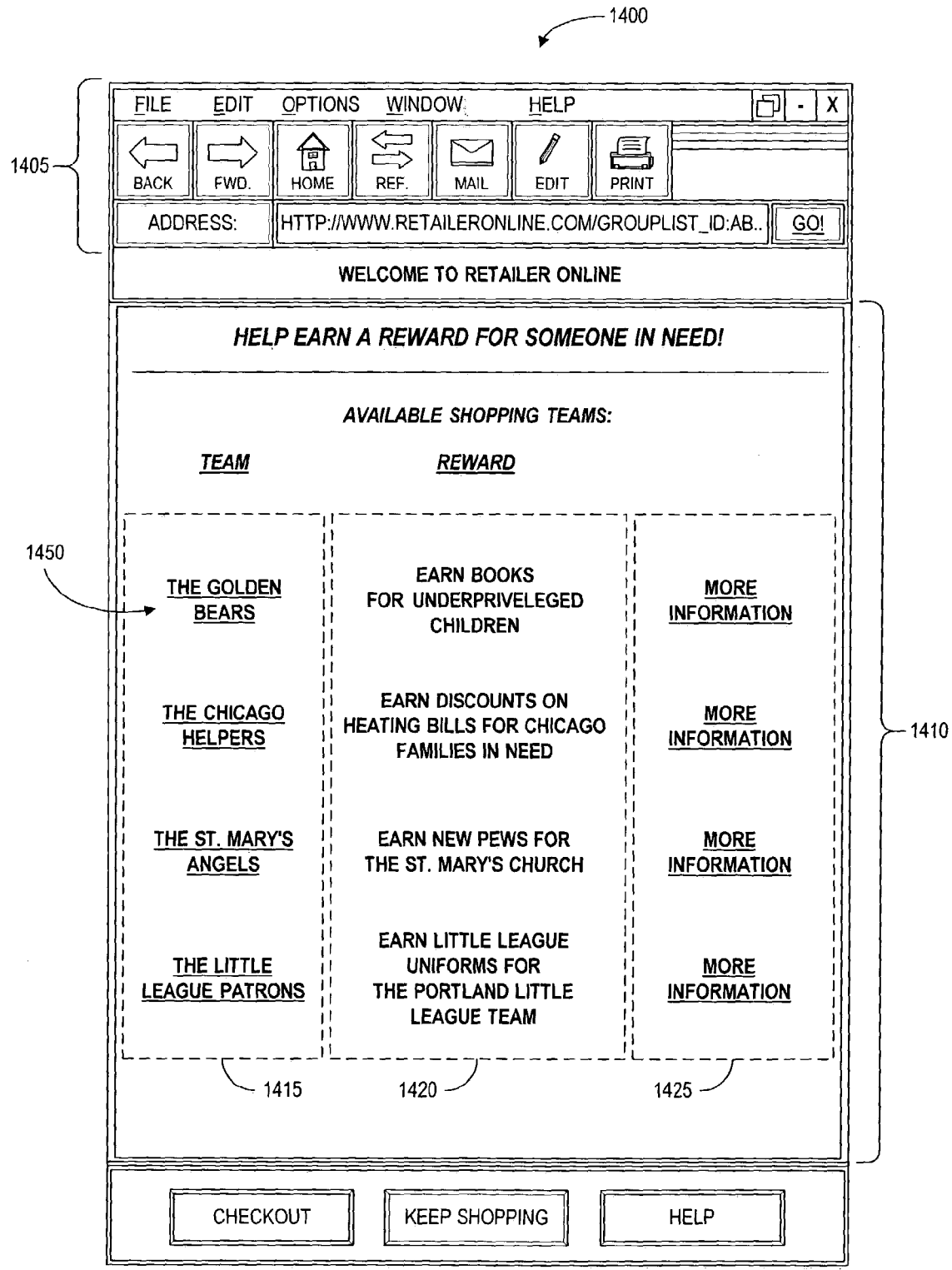
FIG. 14 is an illustration of a Web page depicting available shopping teams that a customer of an online retailer may join, in accordance with one or more embodiments of the present invention.

Referring now to FIG. 14, a depiction of an exemplary Web page 1400, in accordance with one or more embodiments of the present invention, is illustrated. A Web page such as Web page 1400 may be utilized, for example, in embodiments where a retailer or other entity posts one or more groups available for joining to one or more customers. The Web page 1400 is comprised of two main areas, area 1405 and area 1410. Area 1405 depicts browser information (e.g., such as the Web toolbar of Microsoft™ Explorer™). Area 1410 depicts data regarding team shopping groups that are available for joining via the Web page 1400. The area 1410 comprises rows of data, including row 1450, each row defining a group that a customer viewing the Web page 1400 may join. The area 1410 comprises three columns of data, including column 1415, column 1420, and column 1425.

Column 1415 indicates the names of the groups that are available for joining. In one or more embodiments an identifier of a group other than a name may appear in column 1415 or elsewhere on Web page 1400 to uniquely identify a group. The name of a group may be, for example, selected by one or more members of a group, or assigned by a retailer or other entity facilitating a group reward program in accordance with the present invention. One or more of the group names in column 1415 may comprise, for example, a hyperlink to another Web page where additional details on the group may be provided (e.g., the names and/or identifiers of current members of the group).

Column 1420 indicates a brief description of the reward that corresponds to the name of each group depicted in column 1415. One or more of the brief descriptions of the rewards in column 1420 may comprise hyperlinks to another Web page, wherein more details on the rewards are provided.

Column 1425 indicates a plurality of hyperlinks marked "more information". Each of the hyperlinks in column 1425 corresponds to a particular one of the groups available for joining. A customer may obtain more information on a particular group, a particular reward that the group is attempting to earn, and/or the conditions the customer would need to agree to in order to join the group by clicking on the "more information" hyperlink in the row corresponding to the group the customer is interested in joining. It should be noted that the hyperlink of a group's name, the hyperlink of the brief description of the reward, and/or the hyperlink marked "more information" in a given row may each link a customer to the same Web page (e.g., a Web page devoted to providing information regarding the group and the reward it is attempting to earn). It should be noted that, rather than requiring a customer to click on a hyperlink in order to obtain additional information on any given group, the additional information may be displayed directly on Web page 1400.

While the best mode for carrying out the invention has been described in detail in the foregoing, those of ordinary skill in the art to which the instant invention relates will recognize various alternative designs and embodiments for practicing the invention. Such alternative embodiments are contemplated to be within the scope of the instant invention. Accordingly, it is to be understood that the foregoing description is provided for illustrative purposes only and does not limit the scope of the instant invention, as defined by the appended claims.

For example, a group may be registered for and attempting to earn more than one reward at any given time. Further, different members of a group may be attempting to earn a different reward at any given time by satisfying the same purchasing conditions. For example, a first member of a group may be attempting to earn a first reward while a second member of a group may be attempting to earn a second reward. In such an example, the purchasing condition(s) that the first member and the second member need satisfy in order to earn their respective rewards may or may not be the same. Further, each of the first member and the second member may need to individually satisfy one or more purchasing conditions (e.g., both the first member and the second member may need to spend $100 per week for six weeks) in order to earn their respective rewards. Alternatively, the group as a whole may need to satisfy one or more purchasing conditions (e.g., the aggregate value of purchases for the group may need to be $500 per week for six weeks) in order for the first member and the second member to earn their respective reward.

We claim:

1. A method comprising:
   receiving, by a retailer and via an apparatus interface, an indication of a group of customers,
      wherein the indication of the group defines a number of customers in the group and further wherein the group comprises at least a first customer and a second customer;
   receiving an indication of a reward the group desires to earn in exchange for completing purchases at the retailer,
      wherein the indication of the reward defines an expected cost of the reward to the retailer;

determining, based at least partially on the number of customers and the expected cost, purchasing conditions the group would have to satisfy in order to exam the reward,
   wherein the purchasing conditions define at least one of
      a number of purchases,
      a frequency of purchases, and
      a value of purchases
   to be made by the group at the retailer,
   wherein the purchasing conditions comprise at least one respective purchasing condition for each respective customer comprising the group;
   and wherein the purchasing conditions comprise at least a first purchasing condition associated with the first customer and a second purchasing condition associated with the second customer, and
   wherein the first purchasing condition associated with the first customer is different from the second purchasing condition associated with the second customer;
outputting the purchasing conditions to the group;
receiving, from the group, a response to the purchasing conditions, and
registering the group for the reward if the response indicates an acceptance of the purchasing conditions.

2. The method of claim 1, wherein the step of determining comprises:
   determining an amount of profit to be realized by the retailer;
   determining the purchasing conditions such that the amount of profit realized by the retailer if the purchasing conditions are satisfied is at least a predetermined amount of profit.

3. The method of claim 2, wherein the step of determining the amount of profit further comprises:
   determining the expected cost of the reward;
   determining an expected cost of the purchases to be made by the group in accordance with the purchasing conditions;
   determining an expected monetary value to be received by the retailer as a result of registering the group to earn the reward in accordance with the purchasing conditions; and
   subtracting
      (a) the expected monetary value
   from the sum of
      (a) the expected cost of the reward, and
      (b) an expected cost of the purchases.

4. The method of claim 3, wherein the step of determining the expected monetary value comprises:
   determining a sum of payments to be received by the retailer from the group for the purchases to be made in accordance with the purchasing conditions.

5. The method of claim 3, wherein the step of determining the expected monetary value comprises:
   determining a monetary value of acquiring at least one new customer.

6. The method of claim 3, wherein the step of determining the expected monetary value comprises:
   determining a monetary value of habituating at least one customer into a shopping pattern with the retailer.

7. The method of claim 3, wherein the step of determining the expected monetary value comprises:
   determining an estimated value of purchases that would have been completed by at least one customer at another retailer if the customer had not been part of the group registered to earn the reward.

8. The method of claim 3, wherein the step of determining the expected cost of the purchases comprises:
   determining an expected cost to the retailer of products and services included in the purchases to be made by the group.

9. The method of claim 3, wherein the step of determining the expected cost of the purchases comprises:
   determining operating expenses incurred by the retailer.

10. The method of claim 1, wherein the step of determining purchasing conditions further comprises:
    determining information on past purchases completed by one or more customers comprising the group; and
    determining, based at least partially on the information on past purchases, purchasing conditions the group would have to satisfy in order to earn the reward.

11. The method of claim 1, wherein the purchasing conditions comprise at least one purchasing condition that has to be satisfied by a respective customer comprising the group.

12. The method of claim 1, wherein each respective purchasing condition for each respective customer is determined based on data associated with the respective customer.

13. The method of claim 12, wherein the data comprises data of past purchases completed by the respective customer.

14. The method of claim 1, wherein the indication of the reward further comprises:
    a time by which the group desires to earn the reward; and
    wherein step of determining comprises:
    determining, based at least partially on the time by which the group desires to earn the reward, purchasing conditions the group would have to satisfy in order to earn the reward.

15. The method of claim 1, wherein the purchasing conditions define a time by which the group will earn the reward.

16. The method of claim 1, wherein the reward comprises:
    at least one of a product and service offered for sale by an entity other than the retailer.

17. The method of claim 1, wherein the reward comprises:
    at least one of a specified number of units of a product and a specified number of provisions of a service offered for sale by an entity other than the retailer.

18. The method of claim 1, further comprising:
    determining that the group has satisfied the purchasing conditions; and
    providing the reward to the group.

19. The method of claim 18, wherein the step of providing comprises:
    providing payment for the reward to the group, thereby providing the group with a means by which to purchase the reward from an entity other than the retailer.

20. The method of claim 1, further comprising:
    determining, if the response from the group indicates a rejection of the purchasing conditions, alternate purchasing conditions;
    outputting the alternate purchasing conditions to the group;
    receiving, from the group, a response to the alternate purchasing conditions; and
    registering the group for the alternate purchasing conditions if the response indicates an acceptance of the alternate purchasing conditions.

21. The method of claim 20, further comprising:
    receiving, with the response from the group, information for use in determining alternate purchasing conditions.

22. The method of claim 21, wherein the information comprises at least one of a revised number of customers comprising the group, a revised value of the reward, and a revised time by which the group desires to earn the reward.

23. The method of claim 21, wherein the information comprises a suggestion for modifying one or more of the outputted purchasing conditions.

24. The method of claim 1, wherein the indication of the reward further defines an expected cost of the reward to the retailer by specifying a monetary amount the retailer would have to provide in order to obtain the reward for the group.

25. The method of claim 1, wherein the indication of the reward further defines an expected cost of the reward to the retailer by providing information describing the reward,
   wherein the information is sufficient to enable the retailer to determine how much the retailer would have to pay to another entity that offers the reward for sale, in order to provide the reward to the group.

26. The method of claim 25, wherein the information describing the reward comprises:
   an identification of at least one entity that offers the reward for sale.

27. The method of claim 25, wherein the information describing the reward comprises:
   an identification of at least one entity that manufactures the reward.

28. The method of claim 25, wherein the information describing the reward comprises:
   characteristics of the reward that the retailer may utilize to find an entity that offers the reward for sale.

29. The method of claim 25, wherein the information describing the reward comprises:
   a price for the reward, as charged by an entity that offers the reward for sale.

* * * * *